(12) United States Patent
Quinn

(10) Patent No.: US 12,215,763 B2
(45) Date of Patent: Feb. 4, 2025

(54) DRIVE TRAIN

(71) Applicant: ZEROSHIFT TRANSMISSIONS LIMITED, Milton Keynes (GB)

(72) Inventor: Neil Quinn, Port Talbot West Glamorgan (GB)

(73) Assignee: ZEROSHIFT TRANSMISSIONS LIMITED, Milton Keynes (GB)

(*) Notice: Subject to any disclaimer, the term of this patent is extended or adjusted under 35 U.S.C. 154(b) by 0 days.

(21) Appl. No.: 17/797,051

(22) PCT Filed: Feb. 6, 2020

(86) PCT No.: PCT/GB2020/050272
§ 371 (c)(1),
(2) Date: Aug. 2, 2022

(87) PCT Pub. No.: WO2021/156585
PCT Pub. Date: Aug. 12, 2021

(65) Prior Publication Data
US 2023/0062099 A1    Mar. 2, 2023

(30) Foreign Application Priority Data
Feb. 4, 2020 (GB) .................................... 2001472

(51) Int. Cl.
*F16H 3/093* (2006.01)
*B60K 1/02* (2006.01)
(Continued)

(52) U.S. Cl.
CPC ............. *F16H 3/093* (2013.01); *B60K 1/02* (2013.01); *B60K 17/08* (2013.01); *F16H 3/126* (2013.01);
(Continued)

(58) Field of Classification Search
CPC ...... F16H 3/093; F16H 3/126; F16H 61/0059; F16H 61/0403; F16H 63/04;
(Continued)

(56) References Cited

U.S. PATENT DOCUMENTS

2014/0311284 A1    10/2014   Chen et al.

FOREIGN PATENT DOCUMENTS

| CN | 102795103 A | * 11/2012 |
| CN | 107 984 068 A | 5/2018 |

(Continued)

OTHER PUBLICATIONS

English Translation of CN 102795103A (Year: 2012).*
(Continued)

*Primary Examiner* — Victor L Macarthur
(74) *Attorney, Agent, or Firm* — Knobbe, Martens, Olson & Bear, LLP

(57) ABSTRACT

A drive train, including: a first electric motor; a second electric motor; and a transmission system including a first input shaft driveably connected to the first electric motor, a second input shaft driveably connected to the second electric motor, a first gear train including a first gear element rotatably mounted on the first input shaft and a second gear element rotatably mounted on the second input shaft, a second gear train including a third gear element rotatably mounted on the first input shaft and a fourth gear element rotatably mounted on the second input shaft, a gear selector assembly arranged to selectively lock either the first and third gear elements for rotation with the first input shaft or the second and fourth gear elements for rotation with the second input shaft.

23 Claims, 31 Drawing Sheets

(51) Int. Cl.
  *B60K 17/08* (2006.01)
  *F16H 3/12* (2006.01)
  *F16H 61/00* (2006.01)
  *F16H 61/04* (2006.01)
  *F16H 63/04* (2006.01)
  *F16H 3/08* (2006.01)

(52) U.S. Cl.
  CPC ..... *F16H 61/0059* (2013.01); *F16H 61/0403* (2013.01); *F16H 63/04* (2013.01); *F16H 2003/0803* (2013.01); *F16H 2003/0933* (2013.01); *F16H 2061/0422* (2013.01); *F16H 2200/0021* (2013.01)

(58) Field of Classification Search
  CPC ..... F16H 2003/0803; F16H 2003/0933; F16H 2061/0422; F16H 2200/0021; F16H 3/089; F16H 3/091; F16H 63/18; F16H 2063/3093; F16H 37/065; F16H 2003/0811; F16H 2061/0433; F16H 61/04; F16H 61/688; F16H 63/30; F16H 2061/0425; B60K 1/02; B60K 17/08; B60Y 2200/91; Y02T 10/62
  See application file for complete search history.

(56) References Cited

FOREIGN PATENT DOCUMENTS

| DE | 102014109169 A1 | | 1/2016 | |
|---|---|---|---|---|
| DE | 102020115664 A1 | * | 12/2021 | ............... B60K 1/00 |
| DE | 102020115666 A1 | * | 12/2021 | ............. F16H 3/006 |
| EP | 2 529 967 B1 | | 12/2012 | |
| EP | 3 388 274 A1 | | 10/2018 | |
| GB | 2574291 A | | 3/2019 | |
| GB | 2573592 A | | 11/2019 | |
| JP | 2006038136 A | | 2/2006 | |
| JP | 2014129884 A | | 7/2014 | |
| WO | WO 2004/099654 A1 | | 11/2004 | |
| WO | WO 2005/005868 A1 | | 1/2005 | |
| WO | WO 2005/005869 A1 | | 1/2005 | |
| WO | WO 2005/024261 A1 | | 3/2005 | |
| WO | WO 2005/026570 A1 | | 3/2005 | |
| WO | WO 2006/095140 A1 | | 9/2006 | |
| WO | WO 2006/123128 A1 | | 11/2006 | |
| WO | WO 2006/123166 A2 | | 11/2006 | |
| WO | WO 2007/132209 A2 | | 11/2007 | |
| WO | WO 2008/062192 A1 | | 5/2008 | |
| WO | WO 2008/096140 A1 | | 8/2008 | |
| WO | WO 2008/145979 A1 | | 12/2008 | |
| WO | WO 2009/006253 A2 | | 1/2009 | |
| WO | WO 2010/046652 A1 | | 4/2010 | |
| WO | WO 2010/046654 A1 | | 4/2010 | |
| WO | WO 2010/046655 A1 | | 4/2010 | |
| WO | WO 2012/164237 A1 | | 12/2012 | |

OTHER PUBLICATIONS

International Search Report and Written Opinion for Application No. PCT/GB2020/050274, filed Feb. 6, 2020.

Japanese Office Action for Japanese Application No. 2022-547293 dated Feb. 7, 2024.

* cited by examiner

| State | M1 Active | First Selector 37 | M2 Active | Second Selector 39 |
|---|---|---|---|---|
| 1 | ✗ | Neutral | ✗ | Neutral |
| 2 | ✓ | A | ✗ | Neutral |
| 3 | ✓ | B | ✗ | Neutral |
| 4 | ✗ | Neutral | ✓ | C |
| 5 | ✗ | Neutral | ✓ | D |
| 6 | ✓ | A | ✓ | D |
| 7 | ✓ | B | ✓ | D |
| 8 | ✓ | B | ✓ | C |
| 9 | ✓ | A | ✓ | C |

| State | M1 Active | First Selector 37 | M2 Active | Second Selector 39 |
|---|---|---|---|---|
| 1 | x | Neutral | x | Neutral |

| State | M1 Active | First Selector 37 | M2 Active | Second Selector 39 |
|---|---|---|---|---|
| 2 | ✓ | A | ✗ | Neutral |

| State | M1 Active | First Selector 37 | M2 Active | Second Selector 39 |
|---|---|---|---|---|
| 3 | ✓ | B | ✗ | Neutral |

| State | M1 Active | First Selector 37 | M2 Active | Second Selector 39 |
|---|---|---|---|---|
| 4 | ✘ | Neutral | ✓ | C |

| State | M1 Active | First Selector 37 | M2 Active | Second Selector 39 |
|---|---|---|---|---|
| 5 | x | Neutral | ✓ | D |

| State | M1 Active | First Selector 37 | M2 Active | Second Selector 39 |
|---|---|---|---|---|
| 6 | ✓ | A | ✓ | D |

| State | M1 Active | First Selector 37 | M2 Active | Second Selector 39 |
|---|---|---|---|---|
| 7 | ✓ | B | ✓ | D |

| State | M1 Active | First Selector 37 | M2 Active | Second Selector 39 |
|---|---|---|---|---|
| 8 | ✓ | B | ✓ | C |

| State | M1 Active | First Selector 37 | M2 Active | Second Selector 39 |
|---|---|---|---|---|
| 9 | ✓ | A | ✓ | C |

DRIVE TRAIN

CROSS-REFERENCE TO RELATED APPLICATIONS

This application is the U.S. National Phase under 35 U.S.C. § 371 of International Application PCT/GB2020/050272, filed Feb. 6, 2020, which claims priority to UK Patent Application No. 2001472.6, filed on Feb. 4, 2020, the contents of each of which are incorporated herein by reference in its entirety.

TECHNICAL FIELD

The present invention relates to a drive train. The drive train is particularly suited for use in electric vehicles, but can be used in other applications.

BACKGROUND

In vehicle drive trains having conventional single clutch synchromesh transmissions it is necessary to disengage the transmission from the power source, such as an engine or motor, by operating the clutch before the current gear is deselected and the new gear is engaged. If the power is not disengaged when attempting to engage a new gear the synchromesh is unable to engage the new gear element or has to be forced into engagement with the risk of damaging the transmission and creating torque spikes in the transmission. This is because in most cases the speed of the engine is not matched to the speed of the new gear. For motor vehicles, such as cars, having conventional gearboxes and powered by an engine, the selection of a new gear ratio typically takes between 0.5 and 1 second to complete. So, for example, when a higher gear is selected the time delay allows the engine to reduce its speed [due to its own inertia] to more closely match the speed of the new gear before the clutch re-connects the engine and the transmission, thereby reducing the possibility of torque spikes occurring when the power is reapplied.

Dual Clutch Transmission (DCT) systems have tried to address this problem by using two clutches to handover the transfer of torque seamlessly when shifting between gears. However there are several drawbacks to DCTs, for example they require the use of two friction clutches which are heavy and expensive, they are complex to control and have parasitic losses and therefore are not very efficient.

Another type of seamless transmission system is referred to as an instantaneous type transmission system. This family of transmission systems includes at least one selector assembly that includes first and second sets of engagement elements that are arranged to selectively engage drive formations on each gear element associated with it. The first and second set sets of engagement elements are arranged such that a new gear can be selected while the current gear is still engaged and therefore the new gear can be selected under power for at least some shift types. A selector assembly of this type has four modes of operation with respect to each gear element associated with it: fully engaged in both torque directions (fully in gear); disengaged in both torque directions (neutral); engaged in the forward torque direction while disengaged in the reverse torque direction; and disengaged in the forward torque direction while engaged in the reverse torque direction. It is the last two modes that enable a discrete ratio gearbox to have the ability to shift up or down ratios instantly under load without torque interruption.

Instantaneous transmissions are described in WO 2004/099654, WO 2005/005868, WO 2005/005869, WO 2005/024261 and WO 2005/026570, WO 2006/095140, WO 2006/123128, WO2006/123166, WO2007/132209, WO2008/062192, WO2008/096140, WO2008/145979, WO2009/06253, WO2010/046654, WO2010/046655, WO2010/046652, WO2012/164237, GB2573592 and GB2574291 the contents of which are incorporated by reference.

Some of the instantaneous transmissions referred to above are designed primarily for vehicle drive trains that include combustion engines. Accordingly those transmissions are not necessarily optimised for electric vehicles. Nevertheless, it is desirable to have torque support during a gearshift in a transmission system for an electric vehicle comprising discrete ratios to prevent loss of power to the wheels during the gearshift, even if this can be achieved for some shift types only and not others. Furthermore, it is desirable to provide torque support using a relatively simple and compact transmission layout, for example by removing any unnecessary components. It is also desirable for the drive train to have a transmission layout that provides flexibility for the relative sizes of the gear elements (and hence the effective gear ratios), a relatively large number of effective gear ratios and that allows for flexibility for the choice of electric motors used in the drive train. Also, some instantaneous transmission systems can suffer from shift shock (torque spikes) when shifting between gears for at least some shift types. This is because a new gear can be selected while a current gear is still engaged for some gear shifts, and there can be a speed difference between the currently engaged gear and the new gear. For some applications, such as motor sports vehicles, some shift shock can be acceptable. However, for other applications where a more refined shift is required, such as passenger vehicles, shift shock is undesirable.

EP2529967 discloses a drive train that is suitable for use with electric vehicles. The drive train includes first and second electric motors and a transmission system. The transmission system includes first and second primary shafts. The first electric motor is coupled with the first primary shaft and the second electric motor is coupled with the second primary shaft. The first and second primary shafts are arranged co-axially. The transmission system includes four forward gears. Odd gears ($1^{st}$ and $3^{rd}$ gears) are associated with the first primary shaft, and hence the first electric motor. Even gears ($2^{nd}$ and $4^{th}$ gears) are associated with the second primary shaft and hence the second motor. The drive train is arranged such that drive from both the first and second motors can be supplied to an output (a differential gear) simultaneously. For example, in a first mode of operation the $1^{st}$ gear and $2^{nd}$ gear can be engaged simultaneously, with the first motor providing drive to the output via $1^{st}$ gear and the second motor providing drive to the output via $2^{nd}$ gear. Torque support can be provided to the output during a shift so that there is no loss of drive during a gear shift. However a significant limitation of this drive train is that the first motor is only able to provide drive to the output via the odd gears and the second motor is only able to provide drive to the output via the even gears. This limits the effectiveness and flexibility of the drive train. The transmission is also relatively large since the primary shafts are arranged co-axially, and the gear trains are arranged in a conventional fashion along the axis of the first and second primary shafts. Also, the gear selector assemblies used are conventional synchromesh gear selector assemblies. The synchronising cones used in those devices are relatively large, which means there is a relatively large separation between each pair gears, and synchronisers are relatively expensive.

SUMMARY

The invention seeks to mitigate at least one of the aforementioned problems, or at least to provide an alternative drive train to existing drive trains.

According to one aspect there is provided a drive train according to claim 1. The drive train provides a relatively high number of operational states, which is larger than the number of gear trains provided. Typically, each operational state has a different effective gear ratio. The drive train is very flexible, for example torque can be supplied to an output from the first electric motor alone, torque can be supplied to the output from the second electric motor alone, or torque can be supplied to the output by the first and second electric motors simultaneously. In at least one operational state, the drive train is able to supply torque from both of the first and second electric motors to the output via a common gear train. The drive train enables the first electric motor to selectively supply torque to an output via an odd gear in one operational state and an even gear in another operational state. The drive train enables the second electric motor to selectively supply torque to an output via an odd gear in one operational state and an even gear in another operational state. The drive train provides torque support during a gear shift so that torque is always provided to the drive wheels during the gear shift, for at least one shift type. The drive train is compact and does not require synchroniser type selector assemblies, which are expensive and relatively large. Using gear selector assemblies of the claimed type helps with synchronising a motor to the new gear during a gear shaft, since it is possible to select a new gear element in a manner wherein the new gear element is locked for rotation in one rotational direction but not the other, which helps to deal with torque reversals during a shift.

Since the drive train includes two motors and has operational states wherein only one of the motors drives the output, if one of the motors should fail the vehicle or other application can continue to operate using the remaining motor.

According to another aspect there is provided a drive train according to claim 2. The drive train has similar advantages according to the arrangement of claim 1. Additionally the drive train undertakes shifts without there being any substantial shift shock (torque spikes) since with the claimed layout it is possible to fully synchronise the speed of one of the motors to the new gear before the shift occurs.

According to another aspect there is provided a drive train.

The drive train can include a first electric motor.
The drive train can include a second electric motor.
The drive train can include a transmission system.

The transmission system can include a first input shaft driveably connected to the first electric motor. The first input shaft can be directly connected to the first electric motor. That is, there are no gears or clutches between an output of the first electrical motor and the first input shaft that transfer drive from the first electrical motor to the first input shaft. For example, the first electrical motor can have a first motor shaft, and the first motor shaft can be coupled to the first input shaft. The first motor shaft can be splined to the first input shaft.

The transmission system can include a second input shaft driveably connected to the second electric motor. The second input shaft can be directly connected to the second electric motor. That is, there are no gears or clutches between an output of the second electrical motor and the second input shaft that transfer drive from the second electrical motor to the second input shaft. For example, the second electrical motor can have a second motor shaft, and the second motor shaft can be coupled to the second input shaft. The second motor shaft can be splined to the second input shaft.

The transmission system can include a first gear train. The first gear train can include a first gear element mounted on the first input shaft. The first gear train can include a second gear element mounted on the second input shaft. In some embodiments the first gear element can be rotatably mounted on the first input shaft. In some embodiments the first gear element can be fixed for rotation with the first input shaft. In some embodiments the second gear element can be rotatably mounted on the second input shaft. In some embodiments the second gear element can be fixed for rotation with the second input shaft.

The transmission system can include a second gear train. The second gear train can include a third gear element mounted on the first input shaft. The second gear train can include a fourth gear element mounted on the second input shaft. In some embodiments the third gear element can be rotatably mounted on the first input shaft.

In some embodiments the third gear element can be fixed for rotation with the first input shaft. In some embodiments the fourth gear element can be rotatably mounted on the second input shaft. In some embodiments the fourth gear element can be fixed for rotation with the second input shaft.

The transmission system can include an output shaft.

The transmission system can include a gear element mounted on the output shaft. In some embodiments the gear element can be rotatably mounted on the output shaft. In some embodiments the gear element can be fixed for rotation with the output shaft.

The transmission system can include a further gear element mounted on the output shaft. In some embodiments the further gear element can be rotatably mounted on the output shaft. In some embodiments the further gear element can be fixed for rotation with the output shaft.

The transmission system can include a gear selector assembly. In some embodiments the gear selector assembly can be arranged to selectively lock the first and third gear elements for rotation with the first input shaft. In some embodiments the gear selector assembly can be arranged to selectively lock to selectively lock the second and fourth gear elements for rotation with the second input shaft. In some embodiments the gear selector assembly can be arranged to selectively lock to selectively lock the gear element and the further gear element for rotation with the output shaft.

The gear selector assembly can be arranged to selectively lock each of its respective gear elements for rotation with its respective shaft from operational modes that include the following modes: lock the gear element for rotation with the shaft in forward and reverse torque directions, lock the gear element for rotation with the shaft in the forward torque direction and not lock in the reverse torque direction; and lock the gear element with rotation with the shaft in the reverse torque direction and not lock in the forward torque direction.

In some embodiments the gear selector assembly can be arranged to selectively lock the first gear element for rotation with the first input shaft from operational modes that include: lock the first gear element for rotation with the first input shaft in forward and reverse torque directions, lock the first gear element for rotation with the first input shaft in the forward torque direction and not lock in the reverse torque direction; and lock the first gear element with rotation with the first input shaft in the reverse torque direction and not lock in the forward torque direction.

In some embodiments the gear selector assembly can be arranged to selectively lock the third gear element for rotation with the first input shaft from operational modes that include: lock the third gear element for rotation with the first input shaft in forward and reverse torque directions, lock the third gear element for rotation with the first input shaft in the forward torque direction and not lock in the reverse torque direction; and lock the third gear element with rotation with the first input shaft in the reverse torque direction and not lock in the forward torque direction.

In some embodiments the gear selector assembly can be arranged to selectively lock the second gear element for rotation with the second input shaft from operational modes that include: lock the second gear element for rotation with the second input shaft in forward and reverse torque directions, lock the second gear element for rotation with the second input shaft in the forward torque direction and not lock in the reverse torque direction; and lock the second gear element with rotation with the second input shaft in the reverse torque direction and not lock in the forward torque direction.

In some embodiments the gear selector assembly can be arranged to selectively lock the fourth gear element for rotation with the first input shaft from operational modes that include: lock the fourth gear element for rotation with the second input shaft in forward and reverse torque directions, lock the fourth gear element for rotation with the second input shaft in the forward torque direction and not lock in the reverse torque direction; and lock the fourth gear element with rotation with the second input shaft in the reverse torque direction and not lock in the forward torque direction.

In some embodiments the gear selector assembly can be arranged to selectively lock the gear element for rotation with the output shaft from operational modes that include: lock the gear element for rotation with the output shaft in forward and reverse torque directions, lock the gear element for rotation with the output shaft in the forward torque direction and not lock in the reverse torque direction; and lock the gear element with rotation with the output shaft in the reverse torque direction and not lock in the forward torque direction.

In some embodiments the gear selector assembly can be arranged to selectively lock the further gear element for rotation with the output shaft from operational modes that include: lock the further gear element for rotation with the output shaft in forward and reverse torque directions, lock the further gear element for rotation with the output shaft in the forward torque direction and not lock in the reverse torque direction; and lock the further gear element with rotation with the output shaft in the reverse torque direction and not lock in the forward torque direction.

The transmission system can include a further gear selector assembly. The further gear selector assembly can be arranged to selectively lock a pair of gear elements for rotation with their respective shaft. Typically the further gear selector assembly selectively locks gear elements for rotation with their respective shaft other than those that are selectable by the gear selector assembly mentioned above. For example, the gear selector assembly can be arranged to selectively lock one of: the first and third gear elements for rotation with the first input shaft; the second and fourth gear elements for rotation with the second input shaft; and the gear element and further gear element for rotation with the output shaft. The further gear selector assembly can be arranged to selectively lock a different one of: the first and third gear elements for rotation with the first input shaft; the second and fourth gear elements for rotation with the second input shaft; and the gear element and further gear element for rotation with the output shaft.

The further gear selector assembly can be arranged to selectively lock each of its respective gear elements for rotation with its respective shaft from operational modes that include the following modes: lock the gear element for rotation with the shaft in forward and reverse torque directions, lock the gear element for rotation with the shaft in the forward torque direction and not lock in the reverse torque direction; and lock the gear element with rotation with the shaft in the reverse torque direction and not lock in the forward torque direction.

In some embodiments the further gear selector assembly can be arranged to selectively lock the first gear element for rotation with the first input shaft from operational modes that include: lock the first gear element for rotation with the first input shaft in forward and reverse torque directions, lock the first gear element for rotation with the first input shaft in the forward torque direction and not lock in the reverse torque direction; and lock the first gear element with rotation with the first input shaft in the reverse torque direction and not lock in the forward torque direction.

In some embodiments the further gear selector assembly can be arranged to selectively lock the third gear element for rotation with the first input shaft from operational modes that include: lock the third gear element for rotation with the first input shaft in forward and reverse torque directions, lock the third gear element for rotation with the first input shaft in the forward torque direction and not lock in the reverse torque direction; and lock the third gear element with rotation with the first input shaft in the reverse torque direction and not lock in the forward torque direction.

In some embodiments the further gear selector assembly can be arranged to selectively lock the second gear element for rotation with the second input shaft from operational modes that include: lock the second gear element for rotation with the second input shaft in forward and reverse torque directions, lock the second gear element for rotation with the second input shaft in the forward torque direction and not lock in the reverse torque direction; and lock the second gear element with rotation with the second input shaft in the reverse torque direction and not lock in the forward torque direction.

In some embodiments the further gear selector assembly can be arranged to selectively lock the fourth gear element for rotation with the second input shaft from operational modes that include: lock the fourth gear element for rotation with the second input shaft in forward and reverse torque directions, lock the fourth gear element for rotation with the second input shaft in the forward torque direction and not lock in the reverse torque direction; and lock the fourth gear element with rotation with the second input shaft in the reverse torque direction and not lock in the forward torque direction.

In some embodiments the further gear selector assembly can be arranged to selectively lock the gear element for rotation with the output shaft from operational modes that include: lock the gear element for rotation with the output shaft in forward and reverse torque directions, lock the gear element for rotation with the output shaft in the forward torque direction and not lock in the reverse torque direction;

and lock the gear element with rotation with the output shaft in the reverse torque direction and not lock in the forward torque direction.

In some embodiments further the gear selector assembly can be arranged to selectively lock the further gear element for rotation with the output shaft from operational modes that include: lock the further gear element for rotation with the output shaft in forward and reverse torque directions, lock the further gear element for rotation with the output shaft in the forward torque direction and not lock in the reverse torque direction; and lock the further gear element with rotation with the output shaft in the reverse torque direction and not lock in the forward torque direction.

In some embodiments the first gear element meshes with the third gear element.

In some embodiments the second gear element meshes with the fourth gear element.

Torque from the second electric motor can be transferred to at least one gear element mounted on first input shaft. For example, torque can be transferred from the second electric motor to the first gear element via the second gear element. Torque can be transferred from the second electric motor to the third gear element via the fourth gear element.

In some embodiments the first gear train can include the gear element mounted on the output shaft. The first gear element can mesh with the gear element mounted on the output member. When the first gear element meshes with the second gear element, and the first gear element meshes with the gear element mounted on the output member this provides a very simple and compact transmission layout. Torque can be selectively provided from the first electric motor to the output member via the first gear train. Torque can be selectively provided from the second electric motor to the output member via the first gear train.

The transmission system can include a third gear train. The third gear train can include a fifth gear element rotatably mounted on the first input shaft. The third gear train can include the gear element mounted on the output member. Torque can be selectively provided from the first electric motor to the output member via the third gear train. Torque can be selectively provided from the second electric motor to the output member via the first and third gear trains. Having the first gear train connecting the first and second input shafts and the third gear train connecting the first input shaft to the output member provides greater flexibility to decide the relative power ratings of the first and second electric motors, and greater flexibly to decide on the relative sizes of the gear elements, and hence the ratios between them. This enables the motor and/or the gearing to be selected for a particular purpose for example, high acceleration, low speed, launching, or cruising at high speed.

The first and fifth gear elements can be fixedly attached to a first sleeve. The first sleeve can be rotatably mounted on the first input shaft. The gear selector assembly can be arranged to selectively lock the first sleeve for rotation with the first input shaft. Since the first and fifth gear elements are fixed for rotation with the first sleeve, by selectively locking the first sleeve for rotation with the first input shaft, the first and fifth gear elements are also selectively locked for rotation with the first input shaft.

The gear selector assembly can be arranged to selectively lock the first sleeve for rotation with the first input shaft from operational modes that include: lock the first sleeve for rotation with the first input shaft in forward and reverse torque directions, lock the first sleeve for rotation with the first input shaft in the forward torque direction and not lock in the reverse torque direction; and lock the first sleeve with rotation with the first input shaft in the reverse torque direction and not lock in the forward torque direction. Since the first and fifth gear elements are locked for rotation with the first sleeve the selection modes for the gear selector assembly are also applicable to the first and fifth gear elements.

In some embodiments the second gear train can include the further gear element mounted on the output shaft. The third gear element can mesh with the further gear element mounted on the output member. In an embodiment wherein the third gear element meshes with the fourth gear element, and the third gear element meshes with the further gear element mounted on the output member, this provides a very simple and compact transmission layout. Torque can be selectively provided from the first electric motor to the output member via the second gear train. Torque can be selectively provided from the second electric motor to the output member via the second gear train.

The transmission system can include a fourth gear train. The fourth gear train can include a sixth gear element rotatably mounted on the first input shaft. The fourth gear train can include the further gear element mounted on the output member. Torque can be selectively provided from the first electric motor to the output member via the fourth gear train. Torque can be selectively provided from the second electric motor to the output member via the second and fourth gear trains. Having second and fourth gear trains provides greater flexibility to decide the relative power ratings of the first and second electric motors, and greater flexibly to decide on the relative sizes of the gear elements and hence the ratios between them. This enables the motor and/or the gearing to be selected for a particular purpose for example, high acceleration, low speed, launching, or cruising at high speed.

The third and sixth gear elements can be fixedly attached to a second sleeve. The second sleeve can be rotatably mounted on the first input shaft. The gear selector assembly can be arranged to selectively lock the second sleeve for rotation with the first input shaft. Since the third and sixth gear elements are fixed for rotation with the second sleeve, by selectively locking the second sleeve for rotation with the first input shaft, the third and sixth gear elements are also selectively locked for rotation with the first input shaft.

The gear selector assembly can be arranged to selectively lock the second sleeve for rotation with the first input shaft from operational modes that include: lock the second sleeve for rotation with the first input shaft in forward and reverse torque directions, lock the second sleeve for rotation with the first input shaft in the forward torque direction and not lock in the reverse torque direction; and lock the second sleeve with rotation with the first input shaft in the reverse torque direction and not lock in the forward torque direction. Since the third and sixth gear elements are locked for rotation with the second sleeve the selection modes for the gear selector assembly are also applicable to the third and sixth gear elements.

The drive train can have at least one operational state, wherein torque is provided to the output member from the first electric motor via the first gear train. An operational state is a normal driving condition of the transmission and is not a gear shift. Gear shifts are conditions wherein the transmission is switching from one operational state to another operational state.

The drive train can have at least one operational state, wherein torque is provided to the output member from the first electric motor via the second gear train.

The drive train can have at least one operational state, wherein torque is provided to the output member from the first electric motor via the third gear train.

The drive train can have at least one operational state, wherein torque is provided to the output member from the first electric motor via the fourth gear train.

The drive train can have at least one operational state, wherein torque is provided to the output member from the second electric motor via the first gear train.

The drive train can have at least one operational state, wherein torque is provided to the output member from the second electric motor via the second gear train.

The drive train can have at least one operational state, wherein torque is provided to the output member from the second electric motor via the third gear train. Torque can be provided to the output member from the second electric motor via the first and third gear trains simultaneously.

The drive train can have at least one operational state, wherein torque is provided to the output member from the second electric motor via the fourth gear train. Torque can be provided to the output member from the second electric motor via the second and fourth gear trains simultaneously.

The drive train can have at least one operational state, wherein torque is provided to the output member by the first electric motor alone. The drive train can have a plurality of operational states wherein torque is provided to the output member by the first motor alone. For example, the drive train can include two operational states wherein torque is provided to the output member by the first motor alone.

The drive train can have at least one operational state, wherein torque is provided to the output member by the second electric motor alone. The drive train can have a plurality of operational states wherein torque is provided to the output member by the second motor alone. For example, the drive train can include two operational states wherein torque is provided to the output member by the second motor alone.

The drive train can have at least one operational state, wherein torque is provided to the output member by the first and second electric motors simultaneously. The drive train can have a plurality of operational states wherein torque is provided to the output member by the first and second electric motors simultaneously. For example, the drive train can have four operational states wherein torque is provided to the output member by the first and second electric motors simultaneously.

The drive train can have at least one operational state, wherein torque is provided to the output member by the first and second electric motors simultaneously via different gear trains. For example, torque can be provided to the output member by the first and second electric motors simultaneously, wherein the first electric motor provides torque via one of the first and second gear trains and the second electric motor provides torque via the other of the first and second gear trains. Torque can be provided to the output member by the first and second electric motors simultaneously, wherein the first electric motor provides torque via one of the third and fourth gear trains and the second electric motor provides torque via the other of the third and fourth gear trains.

The drive train can have at least one operational state, wherein torque is provided to the output member by the first and second electric motors simultaneously via a common gear train. The drive train can be arranged such that for a plurality of operational states torque can be provided to the output member by the first and second electric motors simultaneously via a common gear train. The common gear train can be different for each operational state. For example, torque can be provided to the output member simultaneously by the first and second electric motors, wherein the first and second electric motors provide torque to the output member via the first gear train. Torque can be provided to the output member simultaneously by the first and second electric motors, wherein the first and second electric motors provide torque to the output member via the second gear train. Torque can be provided to the output member by the first and second electric motors simultaneously, wherein the first and second electric motors provide torque to the output member via the third gear train. Torque can be provided to the output member simultaneously by the first and second electric motors, wherein the first and second electric motors provide torque to the output member via the fourth gear train.

The drive train can be arranged such that the first electric motor provides torque to the output member via an odd gear in one operational state and via an even gear in another operational state. For example, for a vehicle embodiment having $1^{st}$, $2^{nd}$, $3^{rd}$, $4^{th}$, etc gears, the first electric motor can provide torque to the output member via an odd gear, such as $1^{st}$ or $3^{rd}$, in one operational state and via an even gear such as, $2^{nd}$ or $4^{th}$, in another operational state.

The drive train can be arranged such that the second electric motor provides torque to the output member via an odd gear in one operational state and via an even gear in another operational state.

The drive train can be arranged to provide torque support to the output member during a gear shift. Therefore there is no torque interruption during a gear shift for at least one shift type. The drive train provides torque support during power on up shifts and power on down shifts. During power off up shifts and power off down shifts, where overrun occurs, battery regeneration can take place.

During a gear shift, the speed of one of the first and second electric motors can be synchronised to the speed of a new gear. This can apply to at least one shift type. This helps to minimise torque spikes during engagement of a new gear by a respective gear selector assembly. For example, the speed of the first electric motor can be synchronised with the rotational speed of one of the first and second sleeves. The speed of the second electric motor can be synchronised with one of the third and fourth sleeves. Synchronising the speed of the electric motor takes place prior to the respective gear selector assembly engaging the new gear. For example, the speed of the first electric motor can be synchronised with the speed of one of the first and second sleeves prior to the gear selector assembly engaging that sleeve. The speed of the second electric motor can be synchronised with the speed of one of the third and fourth sleeves prior to the further gear selector assembly engaging that sleeve. An electronic controller can adjust the speed of the electric motor. Using gear selector assemblies of the claimed type helps when synchronising a motor to the new gear during a gear shaft, since it is possible to select a new gear element in a manner wherein the new gear element is locked for rotation in one rotational direction but not the other, which helps to deal with torque reversals or spikes during a shift.

During a gear shift, the torque output of one of the first and second electric motors can be reduced, and preferably is reduced to zero or near zero. This can apply to at least one shift type.

During a gear shift the torque output of the other of the first and second motors can be increased. This can apply to at least one shift type. This can occur, for an example when shifting from an operational state where both the first and second electric motors supply torque to the output member to another operational state where both the first and second electric motors supply torque to the output member. Increasing the torque output of one motor temporarily compensates for the loss of torque from the other motor.

At least one of the gear selector assembly and further gear selector assembly can include first and second sets of engagement members. The first and second sets of engagement members can be arranged to move independently of each other. The first and second sets of engagement members can be arranged to move into and out of engagement with drive formations associated with the respective gear elements, such as first and third gear elements, second and fourth gear elements or the gear element and the further gear element. The drive formations can be formed directly on the gear element. The drive formations can be formed on a component associated with the gear element, such as a sleeve.

The first and second sets of engagement members can be arranged such that when the first and second sets of engagement members select the first gear element and a braking force is transferred, the first set of engagement members drivingly engages drive formations associated with the first gear element and the second set of engagement members is in an unloaded condition, and when a driving force is transferred the second set of engagement members drivingly engages drive formations associated with the first gear element, and the first set of engagement members is in an unloaded condition.

The first and second sets of engagement members can be arranged such that when the first and second sets of engagement members select the third gear element and a driving force can be transferred, the first set of engagement members drivingly engages drive formations associated with the third gear element and the second set of engagement members is in an unloaded condition, and when a braking force is transferred, the second set of engagement members drivingly engages drive formations associated with the third gear element, and the first set of engagement members is then in an unloaded condition.

The first and second sets of engagement members can be arranged such that when the first and second sets of engagement members select the second gear element and a braking force is transferred, the first set of engagement members drivingly engages drive formations associated with the second gear element and the second set of engagement members is in an unloaded condition, and when a driving force is transferred the second set of engagement members drivingly engages drive formations associated with the second gear element, and the first set of engagement members is in an unloaded condition.

The first and second sets of engagement members can be arranged such that when the first and second sets of engagement members select the fourth gear element and a driving force is transferred, the first set of engagement members drivingly engages drive formations associated with the fourth gear element and the second set of engagement members is in an unloaded condition, and when a braking force is transferred, the second set of engagement members drivingly engages drive formations associated with the fourth gear element, and the first set of engagement members is in an unloaded condition.

The first and second sets of engagement members can be arranged such that when the first and second sets of engagement members select the gear element mounted on the output shaft and a braking force is transferred, the first set of engagement members drivingly engages drive formations associated with the gear element and the second set of engagement members is in an unloaded condition, and when a driving force is transferred the second set of engagement members drivingly engages drive formations associated with the gear element, and the first set of engagement members is in an unloaded condition.

The first and second sets of engagement members can be arranged such that when the first and second sets of engagement members select the further gear element mounted on the output shaft and a driving force is transferred, the first set of engagement members drivingly engages drive formations associated with the further gear element and the second set of engagement members is in an unloaded condition, and when a braking force is transferred, the second set of engagement members drivingly engages drive formations associated with the further gear element, and the first set of engagement members is in an unloaded condition.

The maximum power output rating of the first electric motor can be different from the maximum power output rating of the second electric motor. Different types of motor can be used for the first and second electric motors such that one motor is suited to a first set of operating conditions and the second motor is suitable for a second set of operating conditions.

The first and second input shafts can be parallel. The first and second input shafts can be non-coaxial. The longitudinal axes of the first and second input shafts are sufficiently spaced apart from one another to accommodate gear trains extending from the first input shaft to the second input shaft.

According to another aspect there is provided a drive train, including: a first electric motor; a second electric motor; and a transmission system can include a first input shaft driveably connected to the first electric motor, a second input shaft driveably connected to the second electric motor, a first gear train can include a first gear element rotatably mounted on the first input shaft and a second gear element rotatably mounted on the second input shaft, a second gear train can include a third gear element rotatably mounted on the first input shaft and a fourth gear element rotatably mounted on the second input shaft, a gear selector assembly arranged to selectively lock the first and third gear elements for rotation with the first input shaft, and a further gear selector assembly arranged to selectively lock the second and fourth gear elements for rotation with the second input shaft, wherein the gear selector assembly can be arranged to selectively lock the first gear element for rotation with the first input shaft from operational modes that include: lock the first gear element for rotation with the first input shaft in forward and reverse torque directions, lock the first gear element for rotation with the first input shaft in the forward torque direction and not lock in the reverse torque direction; and lock the first gear element with rotation with the first input shaft in the reverse torque direction and not lock in the forward torque direction; and the gear selector assembly can be arranged to selectively lock the third gear element for rotation with the first input shaft from operational modes that include: lock the third gear element for rotation with the first input shaft in forward and reverse torque directions, lock the third gear element for rotation with the first input shaft in the forward torque direction and not lock in the reverse torque direction; and lock the third gear element with rotation with the first input shaft in the reverse torque direction and not lock in the forward torque direction; and/or the further gear selector assembly can be arranged to selectively lock the second gear element for rotation with the second input shaft from operational modes that include: lock the second gear element for rotation with the second input shaft in forward and reverse torque directions, lock the second gear element for rotation with the second input shaft in the forward torque direction and not lock in the reverse torque direction; and lock the second gear element with rotation with the second input shaft in the reverse torque direction and not lock in the forward torque direction; and the further gear selector assembly can be arranged to selectively lock the fourth gear element for rotation with the first input shaft from operational modes that include: lock the fourth gear element for rotation with the second input shaft in forward and reverse torque directions, lock the fourth gear element for rotation with the second input shaft in the forward torque direction and not lock in the reverse torque direction; and lock the fourth gear element with rotation with the second input shaft in the reverse torque direction and not lock in the forward torque direction.

According to another aspect there is provided a drive train, including: a first electric motor; a second electric motor; and a transmission system including a first input shaft driveably connected to the first electric motor, a second input shaft driveably connected to the second electric motor, an output shaft, a first gear train including a first gear element rotatably mounted on the first input shaft, a second gear element fixed for rotation with the second input shaft and a gear element rotatably mounted on the output shaft, a second gear train including a third gear element rotatably mounted on the first input shaft, a fourth gear element fixed for rotation with the second input shaft and a further gear element rotatably mounted on the output shaft, a gear selector assembly arranged to selectively lock the first and third gear elements for rotation with the first input shaft, and a further gear selector assembly arranged to selectively lock the gear element and further gear element for rotation with the output shaft, wherein at least one of the gear selector assemblies is arranged to selectively lock each of its respective gear elements for rotation with its respective shaft from operational modes that include the following modes: lock the gear element for rotation with the shaft in forward and reverse torque directions, lock the gear element for rotation with the shaft in the forward torque direction and not lock in the reverse torque direction; and lock the gear element with rotation with the shaft in the reverse torque direction and not lock in the forward torque direction.

According to another aspect there is provided a drive train, including: a first electric motor; a second electric motor; and a transmission system including a first input shaft driveably connected to the first electric motor, a second input shaft driveably connected to the second electric motor, an output shaft, a first gear train including a first gear element fixed for rotation with the first input shaft, a second gear element rotatably mounted on the second input shaft, and a gear element rotatably mounted on the output shaft, a second gear train including a third gear element fixed for rotation with the first input shaft, a fourth gear element rotatably mounted on the second input shaft and a further gear element rotatably mounted on the output shaft, a gear selector assembly arranged to selectively lock the second and fourth gear elements for rotation with the second input shaft, and a further gear selector assembly arranged to selectively lock the gear element and further gear element for rotation with the output shaft, wherein at least one of the gear selector assemblies is arranged to selectively lock each of its respective gear elements for rotation with its respective input shaft from operational modes that include the following modes: lock the gear element for rotation with the shaft in forward and reverse torque directions, lock the gear element for rotation with the shaft in the forward torque direction and not lock in the reverse torque direction; and lock the gear element with rotation with the shaft in the reverse torque direction and not lock in the forward torque direction.

According to another aspect, there is provided a drive train, including: a first electric motor; a second electric motor; and a transmission system including a first input shaft driveably connected to the first electric motor, a second input shaft driveably connected to the second electric motor, a first gear train including a first gear element mounted on the first input shaft and a second gear element mounted on the second input shaft, and a second gear train including a third gear element mounted on the first input shaft and a fourth gear element mounted on the second input shaft. The transmission can include an output member, a gear element mounted on the output member, and a further gear element mounted on the output member. The transmission can include a gear selector assembly. The transmission can include a further gear selector assembly Each of the gear selector assembly and the further gear selector assembly can be a conventional gear selector assembly such as a synchromesh gear selector assembly or a dog type selector assembly.

According to another aspect, there is provided a vehicle including a drive train according to any configuration described herein. For example, the vehicle can comprise any one of: a motorcar, lorry, motorcycle, bus, van, all-wheel drive vehicle, tractor, construction vehicle, and excavation vehicle.

BRIEF DESCRIPTION OF THE DRAWINGS

Embodiments will now be described, by way of example only, with reference to the accompanying drawings in which like references indicate equivalent features, wherein.

DETAILED DESCRIPTION

Figure 1:
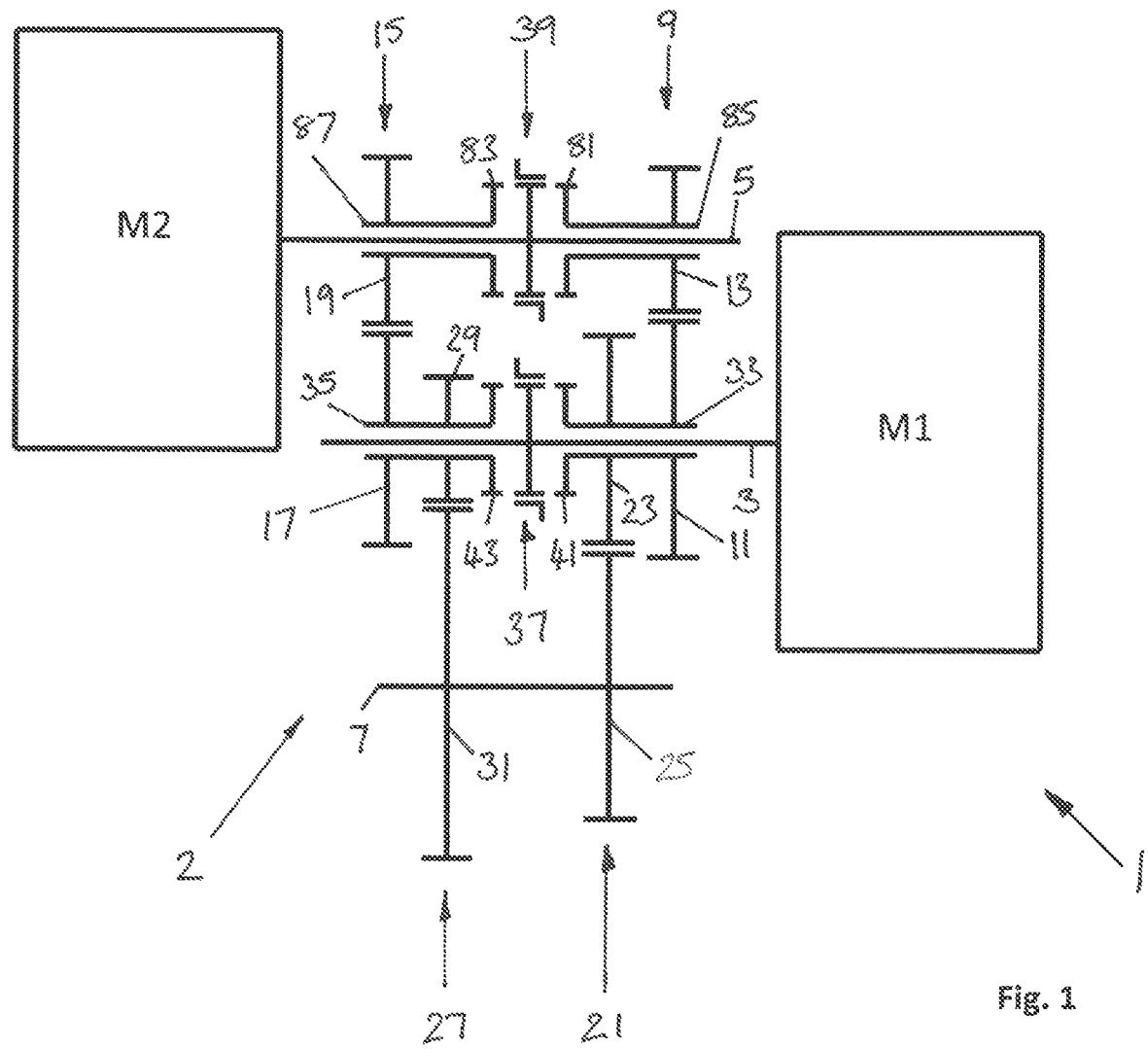
FIG. 1 is a schematic of a drive train in accordance with a first embodiment, the drive train including first and second electric motors and a transmission system.

FIG. 1 shows schematically a drive train 1 according to a first embodiment. The drive train 1 includes a first electric motor M1, a second electric motor M2 and a transmission 2. The drive train can be used on vehicles such as motorcars, lorries, motorcycles, buses, vans, all-wheel drive vehicles, tractors, construction vehicles, and excavation vehicles. Alternatively, the drive train can be used for other applications, such as in a manufacturing process.

The transmission 2 includes a first input shaft 3. The first input shaft 3 is driveably connected to the first electric motor M1. For example, an output shaft of the first electric motor EM1 can be directly coupled to the first input shaft 3, for example can be splined to the first input shaft 3. The transmission 2 includes a second input shaft 5. The second input shaft 5 is driveably connected to the second electric motor M2. For example, an output shaft of the second electric motor EM2 can be directly coupled to the second input shaft 5, for example can be splined to the second input shaft 5.

The first and second input shafts 3, 5 are arranged parallel to one another. Longitudinal axes of the first and second input shafts 3, 5 are spaced apart from one another, such that the first and second input shafts 3, 5 are not co-axial.

The transmission includes an output member in the form of an output shaft 7. In vehicle applications, the output shaft 7 is typically connected to a differential which transfers drive to vehicle wheels via axels.

The transmission 2 includes a first gear train 9 having a gear element 11 rotatably mounted on the first input shaft 3. The first gear train 9 includes a gear element 13 rotatably mounted on the second input shaft 5.

The transmission 2 includes a second gear train 15 having a gear element 17 rotatably mounted on the first input shaft 3. The second gear train 15 includes a gear element 19 rotatably mounted on the second input shaft 5.

The transmission 2 includes a third gear train 21 having a gear element 23 rotatably mounted on the first input shaft 3. The third gear train 21 includes a gear element 25 mounted on the output shaft 7. Preferably the gear element 25 is fixed for rotation with the output shaft 7.

The transmission 2 includes a fourth gear train 27 having a gear element 29 rotatably mounted on the first input shaft 3. The fourth gear train 27 includes a gear element 31 mounted on the output shaft 7. Preferably the gear element 31 is fixed for rotation with the output shaft 7.

The gear element 11 from the first gear train 9 and the gear element 23 from the third gear train 21 are rotatably mounted on the first input shaft 3 by means of a first sleeve 33. The gear elements 11 and 23 are each fixed for rotation with the first sleeve 33. The first sleeve 33 is rotatably mounted on the first input shaft 3 by bearings (not shown).

The gear element 17 from the second gear train 15 and the gear element 29 from the fourth gear train 27 are rotatably mounted on the first input shaft 3 by means of a second sleeve 35. The gear elements 17 and 29 are each fixed for rotation with the second sleeve 35. The second sleeve 35 is rotatably mounted on the first input shaft 3 by bearings (not shown).

The gear element 13 from the first gear train 9 is rotatably mounted on the second input shaft 5 by means of a third sleeve 85. The gear element 13 is fixed for rotation with the third sleeve 85. The third sleeve 85 is rotatably mounted on the second input shaft 5 by bearings (not shown).

The gear element 19 from the second gear train 15 is rotatably mounted on the second input shaft 5 by means of a fourth sleeve 87. The gear element 19 is fixed for rotation with the fourth sleeve 87. The fourth sleeve 87 is rotatably mounted on the second input shaft 5 by bearings (not shown).

The transmission 2 includes a first gear selector assembly 37. The first gear selector assembly 37 is arranged to selectively lock the first sleeve 33 for rotation with the first input shaft 3, and hence is arranged to selectively lock the gear elements 11 and 23 for rotation with the first input shaft 3. The first gear selector assembly 37 is arranged to selectively lock the second sleeve 35 for rotation with the first input shaft 3, and hence is arranged to selectively lock the gear elements 17 and 29 for rotation with the first input shaft 3.

The transmission 2 includes a second gear selector assembly 39. The second gear selector assembly 39 is arranged to selectively lock the third sleeve 85 for rotation with the second input shaft 5, and hence is arranged to selectively lock the gear element 13 of the first gear train 9 for rotation with the second input shaft 5. The second gear selector assembly 39 is arranged to selectively lock the fourth sleeve 87 for rotation with the second input shaft 5, and hence is arranged to selectively lock the gear element 19 of the second gear train 15 for rotation with the second input shaft 5.

The first gear selector assembly 37 is arranged to engage drive formations 41 located on the first sleeve 33 (see FIG. 1). The first selector assembly 37 is arranged to engage drive formations 43 located on the second sleeve 35 (see FIG. 1). The drive formations 41, 43 each comprise a group of dogs. The first group of dogs 41 is located towards one end of the first sleeve 33. The second group of dogs 43 is located towards one end of the second sleeve 35. There are typically three dogs in each group 41, 43. The dogs within a group are evenly circumferentially distributed about the first input shaft 3, i.e. the angles subtended between the centres of a pair of dogs is approximately 120 degrees. Three dogs are preferably used because the arrangement provides relatively large engagement windows, that is the spaces between the dogs, to receive engagement members from the first selector assembly 37. Also, three dogs provide inherent self-centring and even load distribution. Large engagement windows provide greater opportunities for the first selector assembly 37 to fully engage the first and second sleeves 33, 35.

The first selector assembly 37 is mounted on the first input shaft 3 between the drive formations 41 mounted on the first sleeve 33 and the drive formations 43 mounted on the second sleeve 35.

Figure 2:
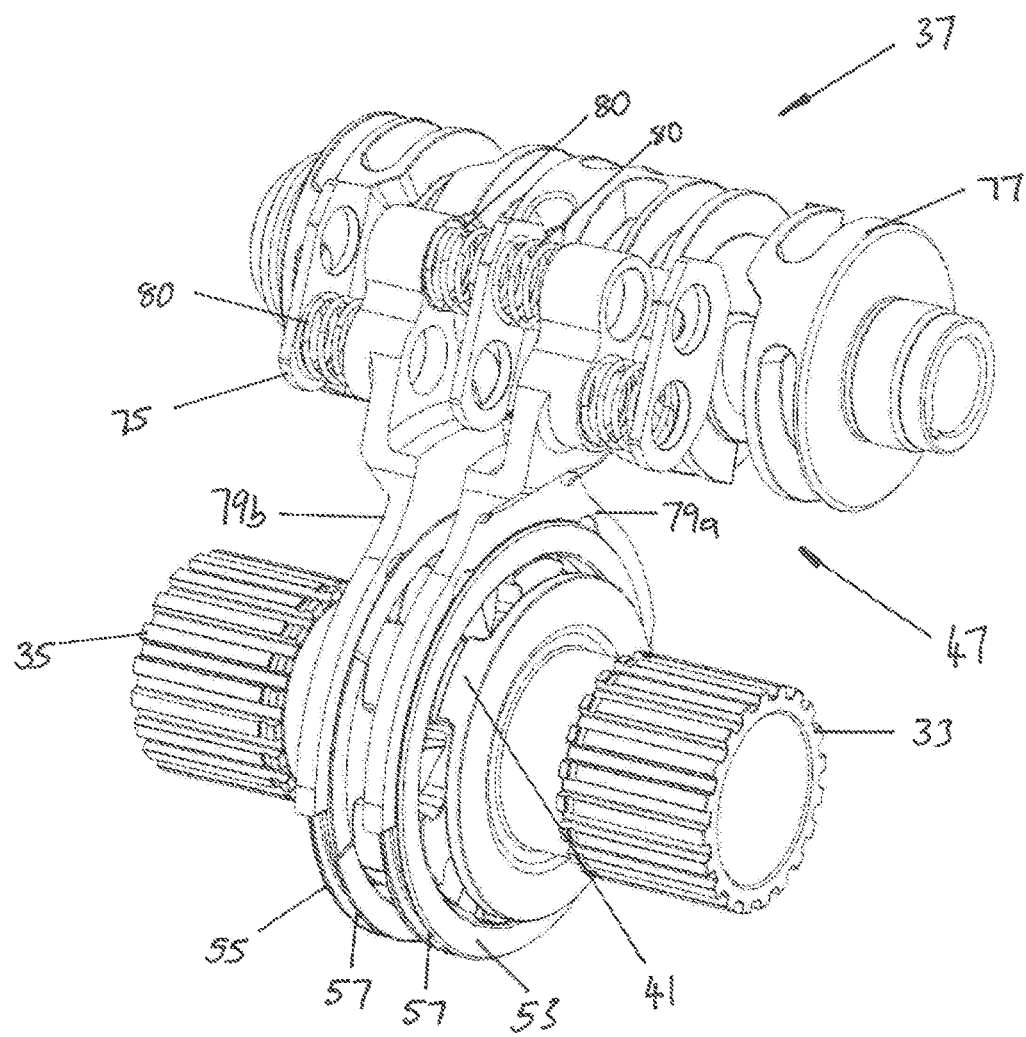
FIG. 2 is an isometric view of a gear selector assembly used in the drive train of FIG. 1.
Figure 3A:
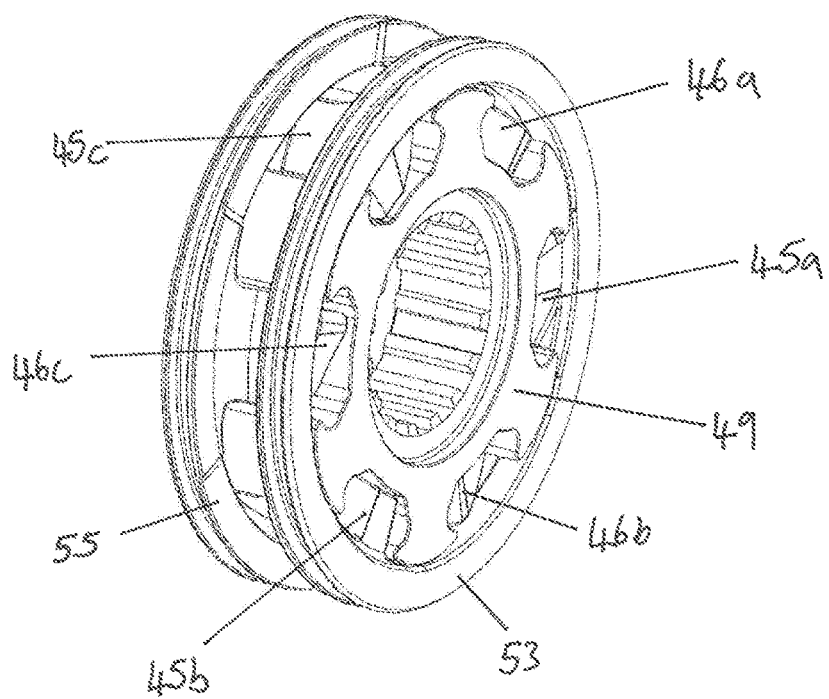
FIG. 3*a* is an isometric view of part of the gear selector assembly of FIG. 2.
Figure 3B:
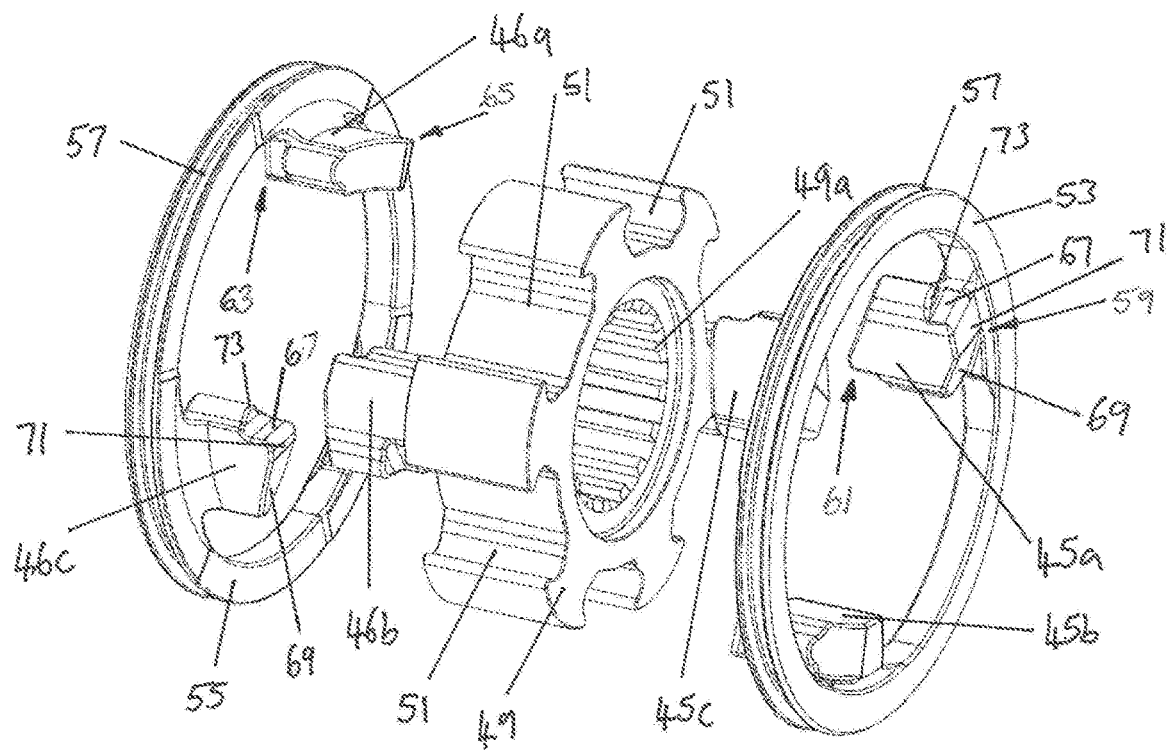
FIGS. 3*b* is an exploded isometric view of the part of the gear selector assembly of FIG. 3*a;*

The first gear selector assembly 37 includes first and second sets of engagement members 45, 46 and an actuator mechanism 47 (see FIGS. 2, 3a and 3b). The first set of engagement members 45 comprises three members 45a-c that are evenly distributed about the first input shaft 3. The second set of engagement members 46 comprises three members 46a-c which are evenly distributed about the first input shaft 3.

The first and second sets of engagement members 45, 46 are mounted on a support 49 which is mounted on the first input shaft 3 (see FIGS. 3a and 3b). The sets of engagement members 45, 46 are arranged to rotate with the first input shaft 3 but are able to slide axially along the support 49 and hence the first input shaft 3 in response to a switching action of the actuator mechanism 47. To facilitate this, the support 49 includes six keyways 51 formed in its curved surface each of which is arranged to receive a respective engagement member 45a-c, 46a-c. Each keyway 51 is profiled to radially and tangentially, but not axially, restrain its respective engagement members 45a-c, 46a-c within the keyway 51 (see FIG. 3b).

The support 49 includes internal splines 49a, which are arranged to engage with external splines formed on the first input shaft 3. This provides a very robust connection between the support 49 and the first input shaft 3. The splined arrangement locks the support 49, and hence the first and second sets of engagement members 45, 46 for rotation with the first input shaft 3.

The arrangement of the sets of engagement members 45, 46 is such that members 45*a-c*, 46*a-c* of a particular set are located in alternate keyways 51 and the member sets 45, 46 can slide along the support 49. The engagement members 45*a-c* in the first set are rigidly connected to each other by a first annular connector member 53 and move as a unit. Thus the first set of engagement members 45*a-c* and the first annular connector member 53 together form a first gear selector ring. The engagement members 45*a-c* in the first set are evenly distributed around the first annular connector member 53. The engagement members 46*a-c* in the second set are rigidly connected to each other by a second annular connector member 55 and move as a unit. Thus the second set of engagement members 46*a-c* and the second annular connector member 55 together form a second gear selector ring. The engagement members 46*a-c* in the second set are evenly distributed around the second annular connector member 55. Each set of engagement members 45, 46 can move independently of the other. When there is relative movement between the first and second sets of engagement members 45, 46, the first annular connector member 53 moves over the second set of engagement members 46 and the second annular connector member 55 moves over the first set of engagement members 45.

Each annular connector member 53, 55 has a groove 57 formed in its outer curved surface that extends fully around the respective annular connector member 53, 55.

Each engagement member 45*a*-45*c* in the first set has a first end 59 arranged to engage the first group of dogs 41 attached to the first sleeve 33 and a second end 61 arranged to engage the second group of dogs 43 attached to the second sleeve 35. The first and second ends 59, 61 typically have the same configuration but are opposite handed, for example the first end 59 of each first engagement member 45*a-c* is arranged to selectively engage the first group of dogs 41 during deceleration (reverse torque direction) of the first sleeve 33 and the second end 61 is arranged to selectively engage the second group of dogs 43 during acceleration (forward torque direction) of the second sleeve 35. For each engagement member 46*a-c* in the second set, the first end 63 is arranged to engage the second group of dogs 43 during deceleration (reverse torque direction) of the second sleeve 35 and the second end 65 is arranged to engage the first group of dogs 41 during acceleration (forward torque direction) of the first sleeve 33.

When both the first and second sets of engagement members 45, 46 engage one of the first and second sets of dogs 41, 43, drive is transmitted between the respective sleeve 33, 35 and the first gear selector assembly 37 in the forward and reverse torque directions.

The first and second ends 59, 61, 63, 65 of each engagement member includes a drive face 67 for drivingly engaging the respective dogs 41, 43, a non-driving face in the form of a ramp 69, an end face 71 and may include a shoulder 73 (see FIG. 3*b*). The end faces 71 limit the axial movement of the engagement members 45*a-c*, 46*a-c*. In some arrangements, side faces of the dogs 41, 43 can be inclined. In this instance, the drive faces 67 may be angled to complement the sides of the dogs 41, 43 so that as the engagement members 45*a-c*, 46*a-c* rotate into engagement, there is face-to-face contact to reduce wear. The purpose of the non-driving faces 69 is to prevent locking engagement between the engagement members and the dogs 41, 43. Each non-driving face 69 is preferably helically formed and slopes away from its respective end face 71. The angle of inclination of the non-driving face 45 can be such that the longitudinal distance between the edge of the non-driving face furthest from the end face 71 and the plane of the end face 71 is larger than the height of the dogs 41, 43. This helps to ensure that the transmission does not lock up when there is relative rotational movement between the engagement members 45*a-c*, 46*a-c* and the dogs 41, 43 that causes the non-driving faces 69 to move towards the respective dogs 41, 43. The dogs 41, 43 do not crash into the sides of the engagement members 45*a-c*, 46*a-c* but rather engage the non-driving faces 69. Further relative rotational movement between the dogs 41, 43 and the engagement members 45*a-c*, 46*a-c* causes the dogs 41, 43 to slide across the non-driving faces 69 and the helical surfaces of the non-driving faces cause the engagement members 45*a-c*, 46*a-c* to move axially along the first input shaft 3 away from the respective dogs 41, 43 so that the transmission does not lock up. Thus the non-driving faces 69 provide a ratcheting effect and the first gear selector assembly 37 is arranged to slip relative to the first and second sleeves 33, 35 respectively under certain operational conditions.

Since the first and second sets of engagement members 45, 46 can move independently of each other, it is possible for the first gear selector assembly 37 to select the first sleeve 33 with one of the first and second sets of engagement members 45, 46 initially. The other of the first and second sets of engagement members 45, 46 engages the first sleeve 33 subsequently. Likewise, it is possible for the first gear selector assembly 37 to select the second sleeve 35 with one of the first and second sets of engagement members initially. The other of the first and second sets of engagement members 45, 46 engages the second sleeve 35 subsequently.

Thus the first gear selector assembly 37 is arranged to selectively engage the first sleeve 33 from operational modes that include the following modes: fully engaged in both forward and reverse torque directions; disengaged in both torque directions (neutral); engaged in the forward torque direction while disengaged in the reverse torque direction; and disengaged in the forward torque direction while engaged in the reverse torque direction. The first gear selector assembly 37 is arranged to selectively engage the second sleeve 35 from operational modes that include the following modes: fully engaged in both the forward and reverse torque directions; disengaged in both torque directions (neutral); engaged in the forward torque direction while disengaged in the reverse torque direction; and disengaged in the forward torque direction while engaged in the reverse torque direction.

When the members of the first and second sets 45, 46 are interleaved (see FIG. 3*a*) the drive faces 67 of the first ends 59 of the first set of members 45 are adjacent the drive faces 67 of the first end 63 of the second set of members 46. When the first and second sets of members 45, 46 are fully engaged with the first sleeve 33, a dog 41 is located between each pair of adjacent drive faces 67. When the first and second sets of members 45, 46 are fully engaged with the second sleeve 35, a dog 43 is located between each pair of adjacent drive faces 67 of the second ends 61, 63 of the engagement members. The dimensions of the dogs 41, 43 and the ends 59, 61, 63, 65 of the engagement members are such that there is little movement of each dog between the drive face 67 of the acceleration member and the drive face 67 of the deceleration member when the sleeve 33, 35 moves from acceleration to deceleration, or vice versa, to ensure that there is little or no backlash in the gear. Backlash is the lost motion experienced when the dog moves from the drive face 67 of the acceleration member to the drive face 67 of the deceleration member when moving from acceleration to deceleration, or vice versa. A conventional dog-type transmission has approximately 30 degrees of backlash. A typical transmission for a car in accordance with the current embodiment has backlash of less than five degrees.

When the first and second sets of members 45, 46 are fully engaged with a respective sleeve 33, 35, and a dog 41, 43 is located between each pair of adjacent drive faces 67, one of the first and second sets of engagement members 45, 46 will be in an loaded condition, and the other of the first and second sets of engagement members 45, 46 will be in an unloaded condition. The unloaded set of engagement members is able to move out of engagement with the currently engaged gear element during a gear shift.

The actuator mechanism 47 includes a shift cradle 75. The mechanism 47 is arranged to actuate the first and second sets of engagement members 45, 46 using only a single actuator such as a shift drum 77 and shift forks 79a, 79b. Preferably the shift cradle 75 includes resilient means, such as helical springs 80. The springs 80 are arranged to bias the first and second sets of engagement members 45, 46 to move in an axial direction when they are in driving engagement with a sleeve 33, 35 and are unable to move.

The second gear selector assembly 39 has a similar arrangement to the first gear selector assembly 37.

The third sleeve 85 includes a third set of drive formations 81 located towards one end of the sleeve. The fourth sleeve 87 includes a fourth set of drive formations 83. The second gear selector assembly 39 is mounted on the second input shaft 5 between the third and fourth sets of drive formations 81, 83. The second gear selector assembly 39 is arranged to selectively engage the third set of drive formations 81 with the first and second sets of engagement members 45, 46 in order to selectively lock the third sleeve 85, and hence gear element 13 for rotation with the second input shaft 5. The second gear selector assembly 39 is arranged to selectively engage the fourth set of drive formations 83 with the first and second sets of engagement members 45, 46 in order to selectively lock the fourth sleeve 87, and hence gear element 19 for rotation with the second input shaft 5.

The second gear selector assembly 39 is arranged to selectively engage the third sleeve 85, and hence the gear element 13, from operational modes that include the following modes: fully engaged in both forward and reverse torque directions; disengaged in both torque directions (neutral); engaged in the forward torque direction while disengaged in the reverse torque direction; and disengaged in the forward torque direction while engaged in the reverse torque direction. The second gear selector assembly 39 is arranged to selectively engage the fourth sleeve 87, and hence gear element 19, from operational modes that include the following modes: fully engaged in both the forward and reverse torque directions; disengaged in both torque directions (neutral); engaged in the forward torque direction while disengaged in the reverse torque direction; and disengaged in the forward torque direction while engaged in the reverse torque direction.

The drive train 1 can include a control system. The movement of the first and second sets of engagement members 45, 46 for each of the gear selector assemblies 37, 39 can be controlled by the control system to provide for fully automatic or semi-automatic gear shifts. The control system can also control operation of the first and second electric motors M1, M2.

The operational states of the drive train 1 are illustrated in FIGS. 4 to 13. In FIGS. 4 to 13:

Reference "A" represents a condition wherein the first gear selector assembly 37 locks the second sleeve 35 for rotation with the first input shaft 3 in forward and reverse torque directions;

Reference "B" represents a condition wherein the first gear selector assembly 37 locks the first sleeve 33 for rotation with the first input shaft 3 in forward and reverse torque directions;

Reference "C" represents a condition wherein the second gear selector assembly 39 locks the fourth sleeve 87 for rotation with the second input shaft 5 in forward and reverse torque directions; and Reference "D" represents a condition wherein the second gear selector assembly 39 locks the third sleeve 85 for rotation with the second input shaft 5 in forward and reverse torque directions.

Operational state 1 is a neutral state, wherein no torque is provided to the output shaft 7.

Operational states 2 to 9 each provide torque to the output shaft 7. Typically, each of operational states 2 to 9 has an effective gear ratio (gearing output) that is different from the other operational states. Thus the transmission 2 can provide eight different effective gear ratios (gearing outputs). Thus a relatively small number of gear trains can provide a relatively larger number of outputs in the layout described.

In some operational states, the output shaft 7 is driven by the first electric motor M1 only. In some operational states, the output shaft 7 is driven by the second electric motor M2 only. In some operational states, the output shaft 7 is driven by the first and second electric motors M1, M2 simultaneously. For operational sates wherein torque is provided to the output shaft 7 by both motors, the torque is additive. Of course, for any given use of the drive train all, or a subsection, of the available operational states of the transmission may be made available to a user to meet the application requirements.

In operational state 2, torque is provided from the first electric motor M1 to the output shaft 7 via the fourth gear train 27. The first gear selector assembly 37 locks the second sleeve 35 for rotation with the first input shaft 3 in forward and reverse torque directions. The second electric motor M2 is not active. The second gear selector assembly 39 is in a neutral condition.

In operational state 3, torque is provided from the first electric motor M1 to the output shaft 7 via the third gear train 21. The first gear selector assembly 37 locks the first sleeve 33 for rotation with the first input shaft 3 in forward and reverse torque directions. The second electric motor M2 is not active. The second gear selector assembly 39 is in a neutral condition.

In operational state 4, torque is provided from the second electric motor M2 to the output shaft 7 via the second and fourth gear trains 15, 27. The second gear selector assembly 39 locks the fourth sleeve 87 for rotation with the second input shaft 5 in forward and reverse torque directions. The first electric motor M1 is not active. The first gear selector assembly 37 is in a neutral condition.

In operational state 5, torque is provided from the second electric motor M2 to the output shaft 7 via the first and third gear trains 9, 21. The second gear selector assembly 39 locks the third sleeve 85 for rotation with the second input shaft 5 in forward and reverse torque directions. The first electric motor M1 is not active. The first gear selector assembly 37 is in a neutral condition.

In operational state 6, torque is provided from the first electric motor M1 to the output shaft 7 via the fourth gear train 27, and torque is provided from the second electric motor M2 to the output shaft 7 via the first and third gear trains 9, 21. The first gear selector assembly 37 locks the second sleeve 35 for rotation with the first input shaft 3 in forward and reverse torque directions. The second gear selector assembly 39 locks the third sleeve 85 for rotation with the second input shaft 5 in forward and reverse torque directions.

In operational state 7, torque is provided from the first electric motor M1 to the output shaft 7 via the third gear train 21, and torque is provided from the second electric motor M2 to the output shaft 7 via the first and third gear train 9, 21. The first gear selector assembly 37 locks the first sleeve 33 for rotation with the first input shaft 3 in forward and reverse torque directions. The second gear selector assembly 39 locks the third sleeve 85 for rotation with the second input shaft 5 in forward and reverse torque directions.

In operational state 8, torque is provided from the first electric motor M1 to the output shaft 7 via the third gear train 21, and torque is provided from the second electric motor M2 to the output shaft 7 via the second and fourth gear trains 15, 27. The first gear selector assembly 37 locks the first sleeve 33 for rotation with the first input shaft 3 in forward and reverse torque directions. The second gear selector assembly 39 locks the fourth sleeve 87 for rotation with the second input shaft 5 in forward and reverse torque directions.

In operational state 9, torque is provided from the first electric motor M1 to the output shaft 7 via the fourth gear train 27, and torque is provided from the second electric motor M2 to the output shaft 7 via the second and fourth gear trains 15, 27. The first gear selector assembly 37 locks the second sleeve 35 for rotation with the first input shaft 3 in forward and reverse torque directions. The second gear selector assembly 39 locks the fourth sleeve 87 for rotation with the second input shaft 5 in forward and reverse torque directions.

Thus for at least some operational states, torque can be provided from the first and second electric motors M1, M2 to the output shaft via at least one common gear train. This helps to provide a compact transmission system. For at least some operational states, torque can be provided from the first and second electric motors M1, M2 to the output shaft via different gear trains.

For operational conditions wherein torque is provided to the output shaft 7 by both the first and second electric motors M1, M2, the control system controls operation of the motors to ensure that they operate at the correct speed for the gear train selected to match the speeds at the output shaft.

In one possible arrangement for a vehicle: operational state 9 can correspond to $1^{st}$ gear; operational state 8 can correspond to 2nd gear; operational state 4 can correspond to $3^{rd}$ gear; operational state 6 can correspond to $4^{th}$ gear; operational state 2 can correspond to $5^{th}$ gear; operational state 7 can correspond to $6^{th}$ gear; operational state 5 can correspond to $7^{th}$ gear; and operational state 3 can correspond to $8^{th}$ gear. It will be apparent from this arrangement, and the operational states described above, that each of the first and second electric motors M1, M2 is capable of providing torque to the output shaft by both odd and even gears.

A significant advantage of the drive train 1 is that it provides torque support to the output shaft 7 during gear shifts. When torque support is provides there is no significant loss of drive to drive wheels of a vehicle during the gear shift. The drive train can be arranged to provide torque support for the following shift types: power on up shifts, power on down shifts, power off up shifts and power off down shifts.

Figure 15:
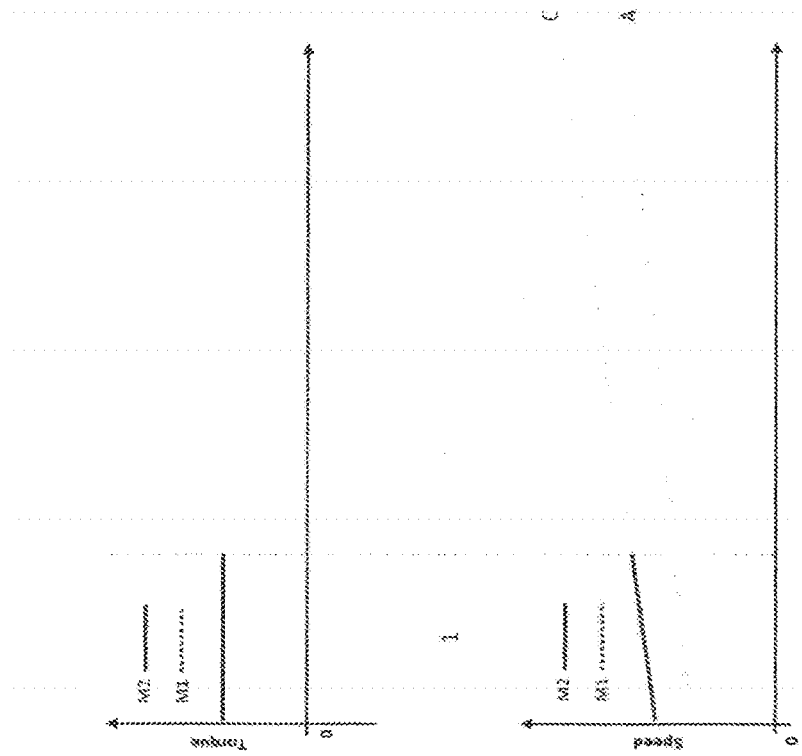
Figure 15:
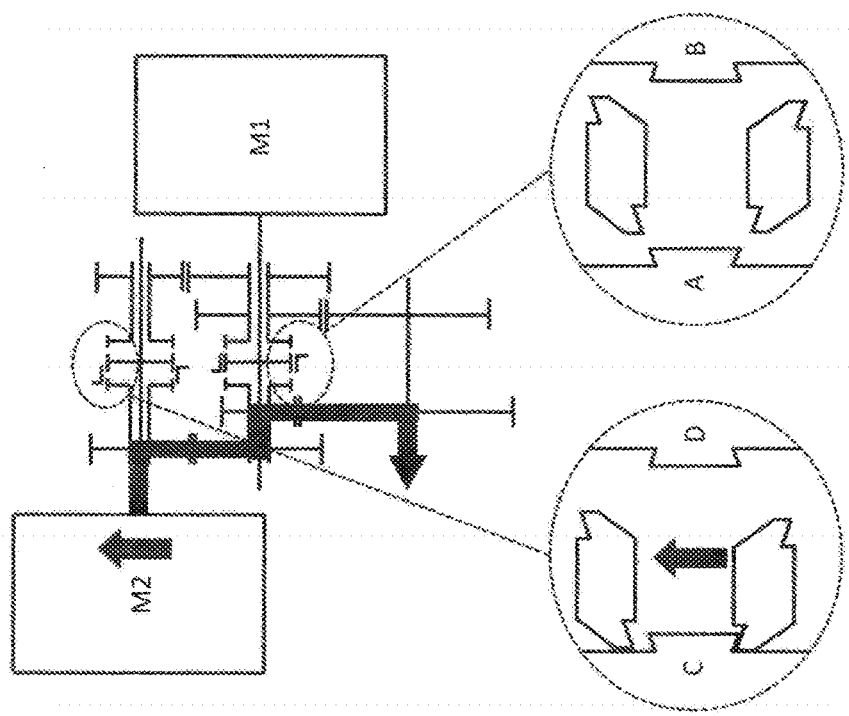
Figure 16:
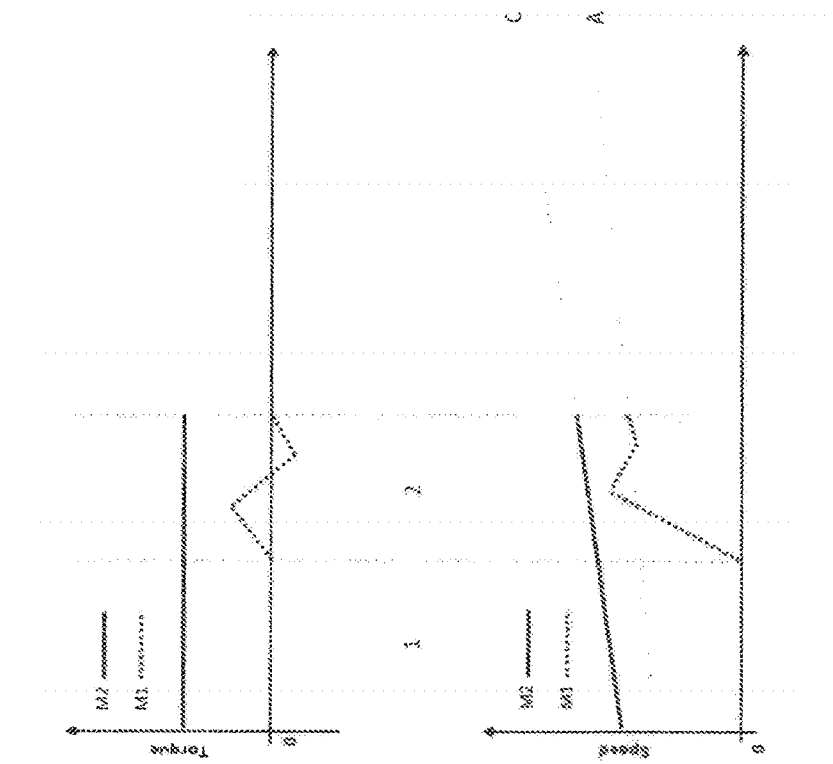
Figure 16:
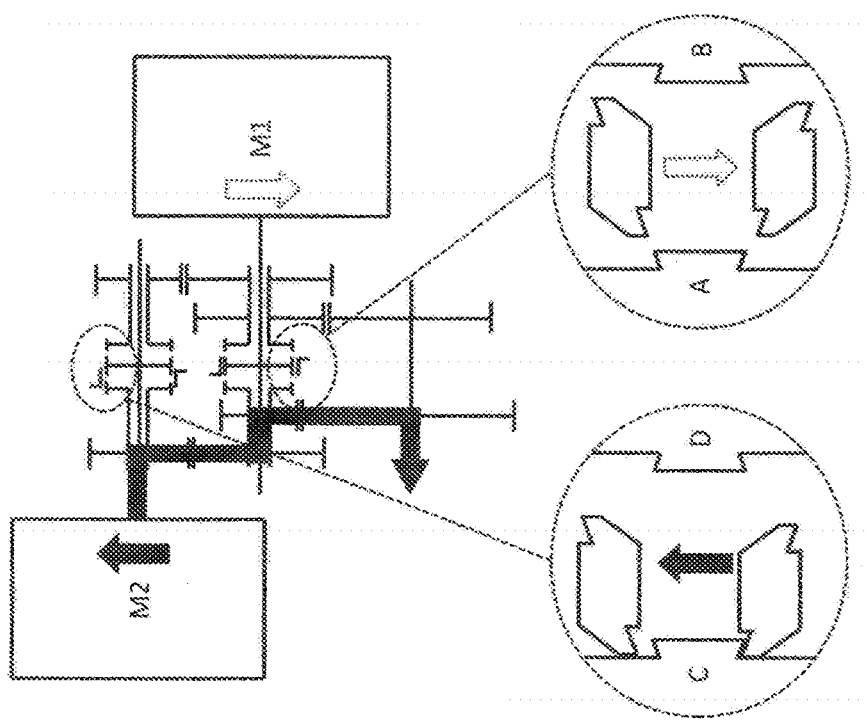
Figure 17:
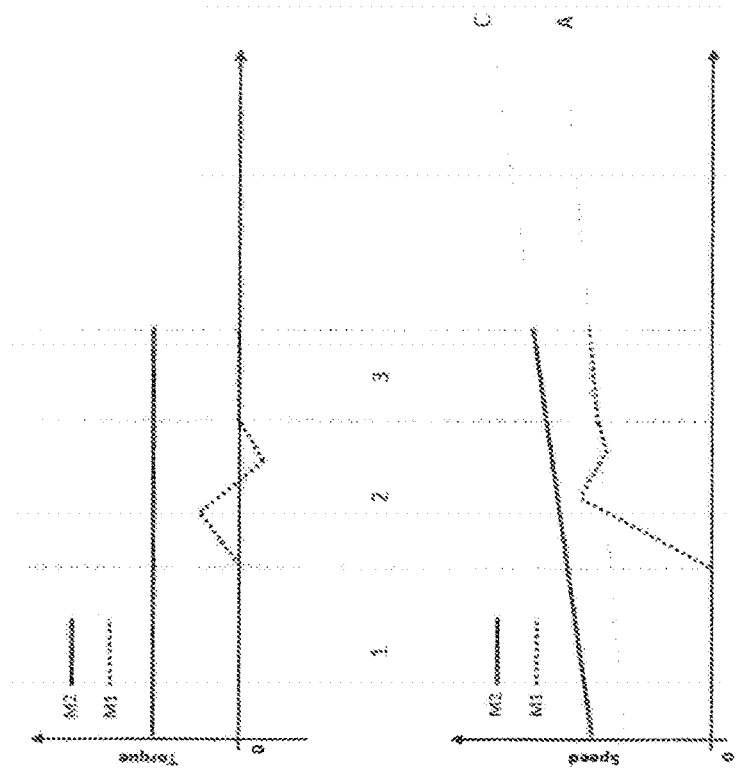
Figure 17:
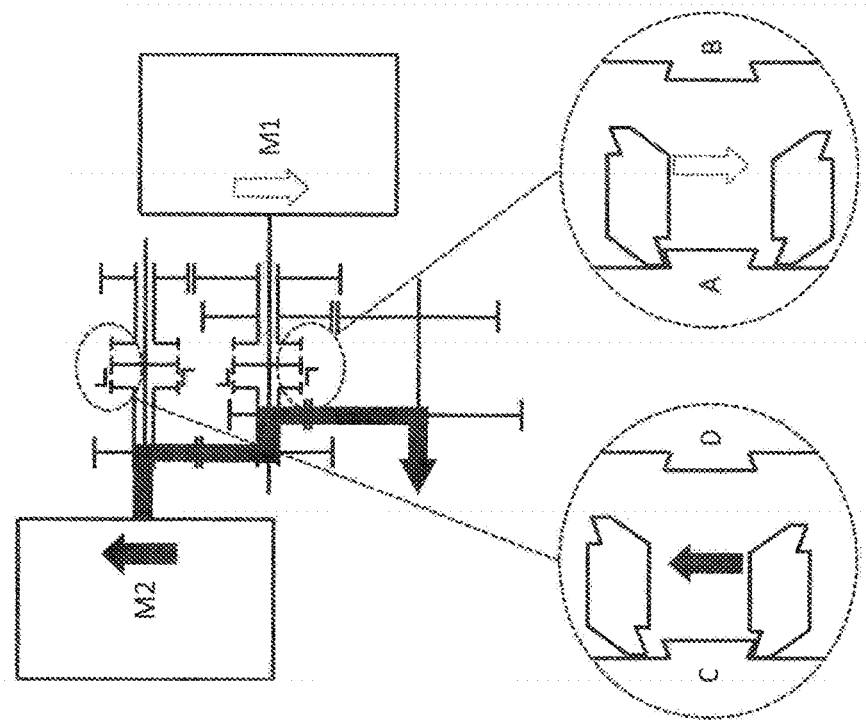
Figure 18:
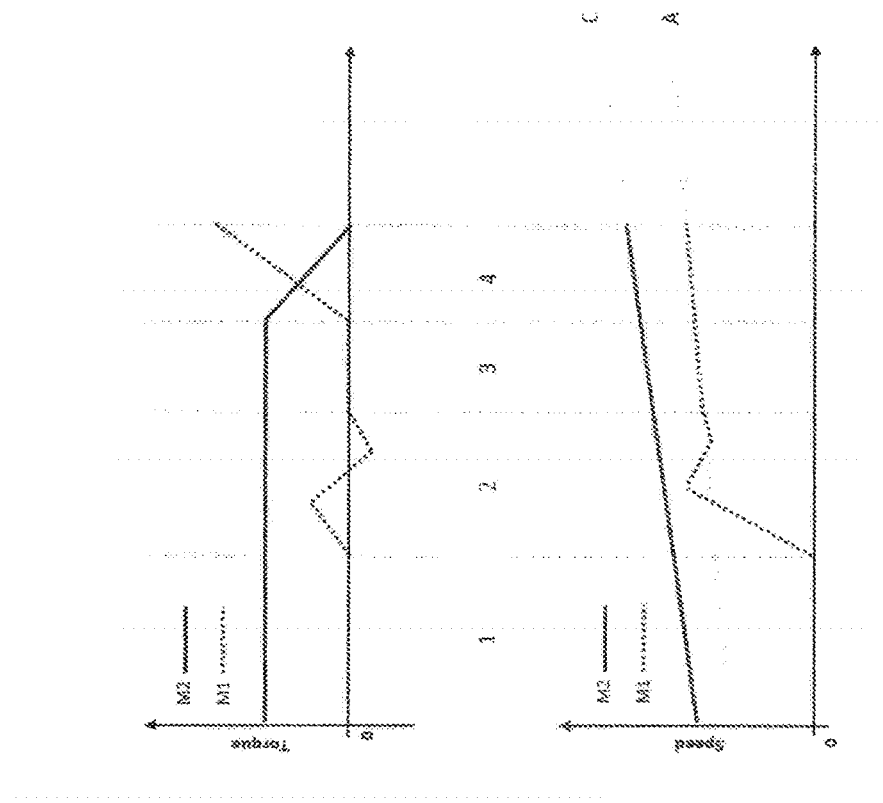
Figure 18:
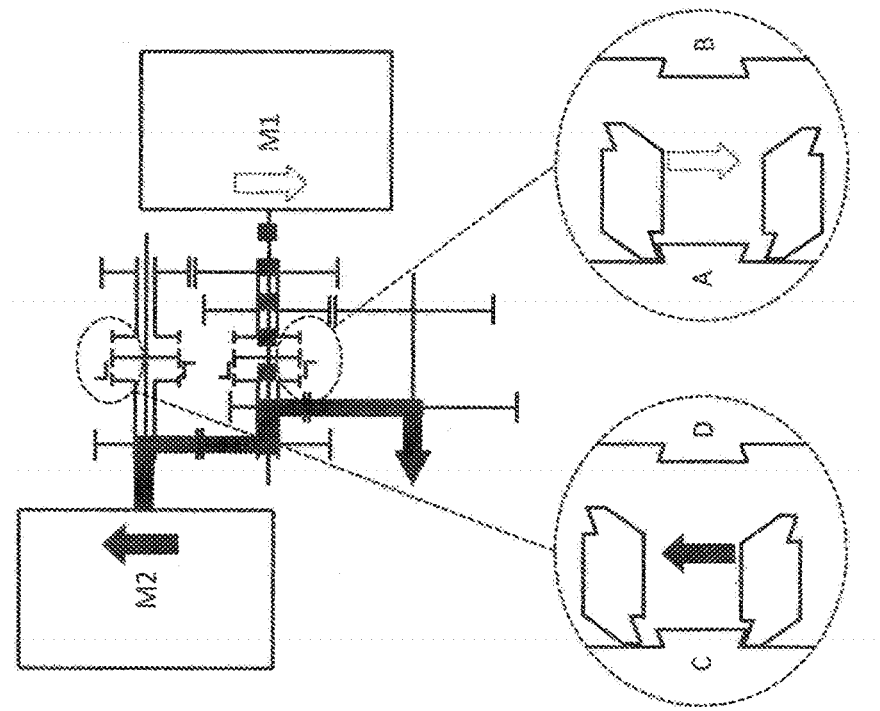
Figure 19:
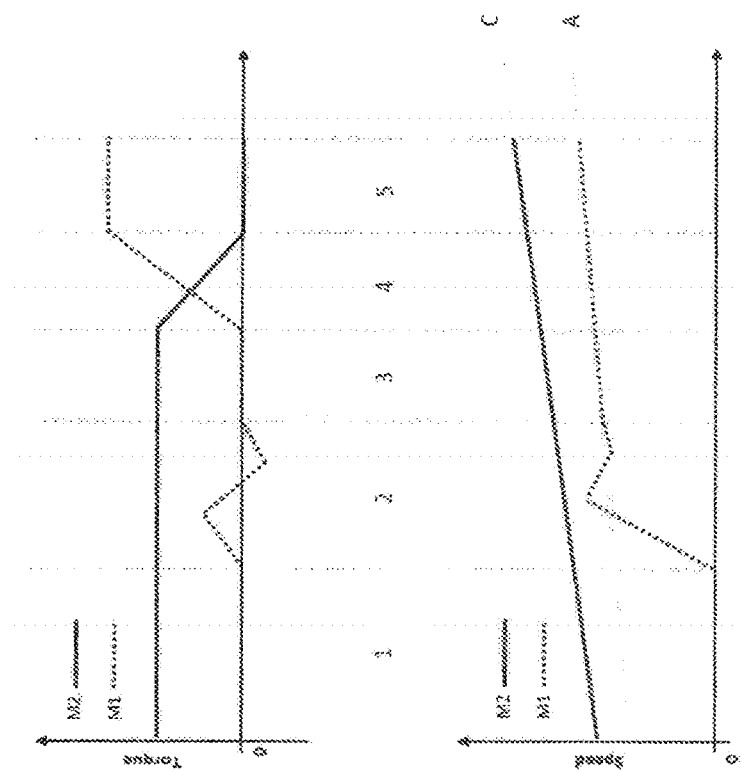
Figure 19:
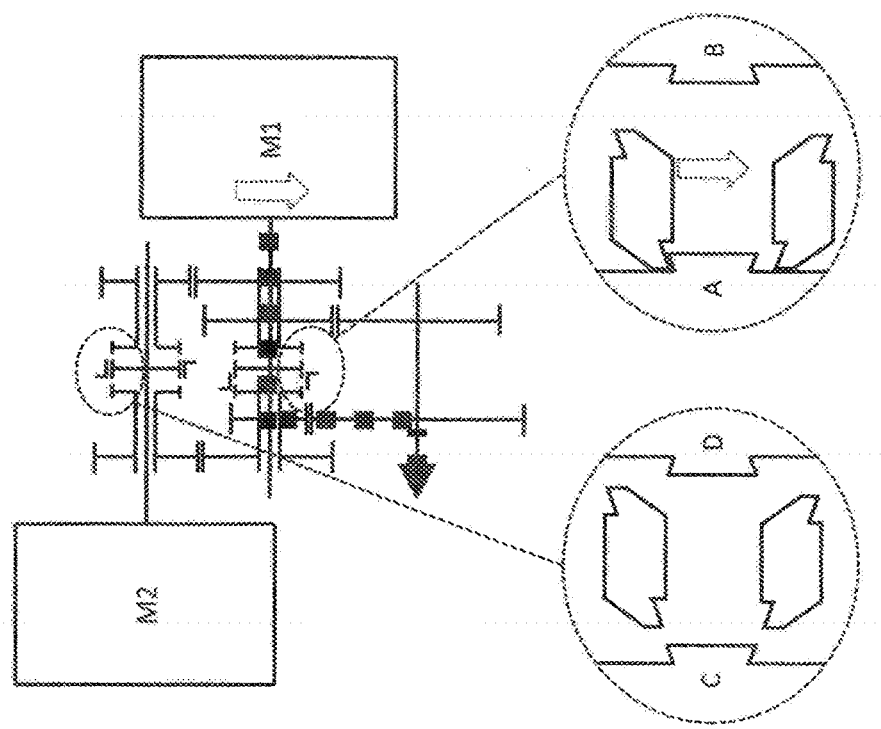
Figure 20:
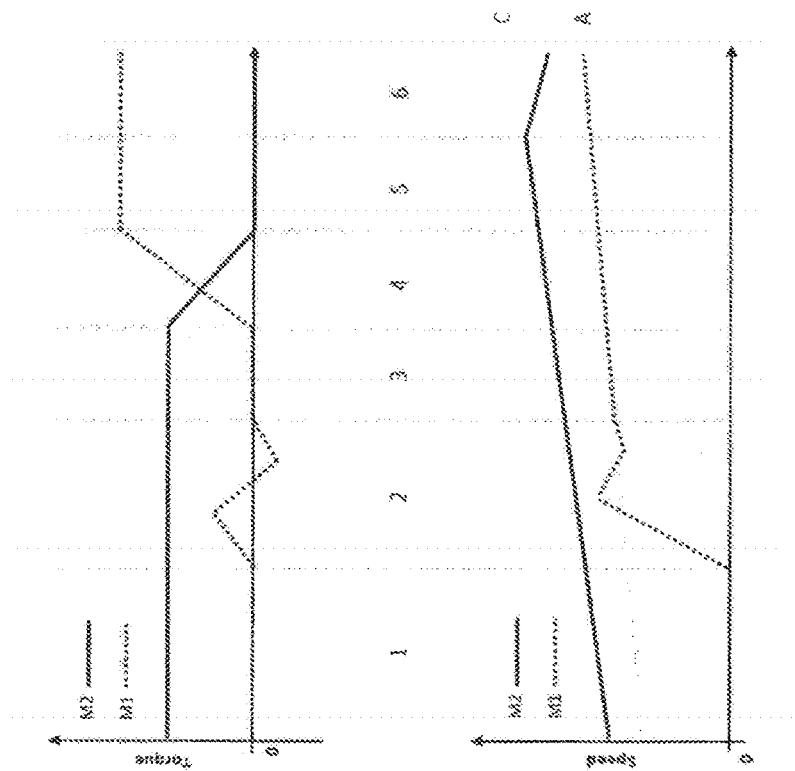
Figure 20:
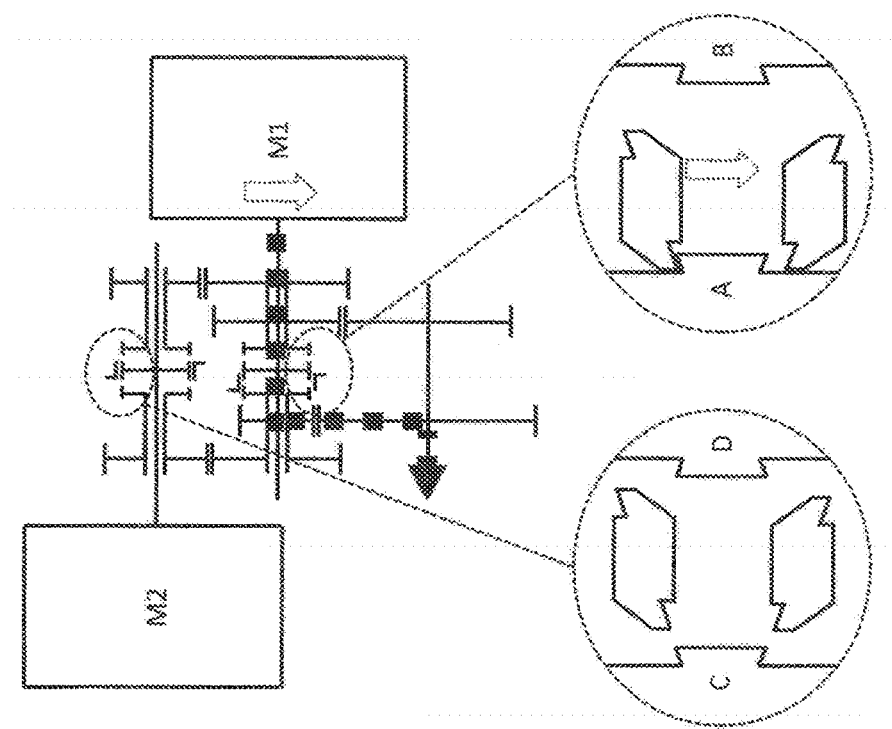
Figure 21:
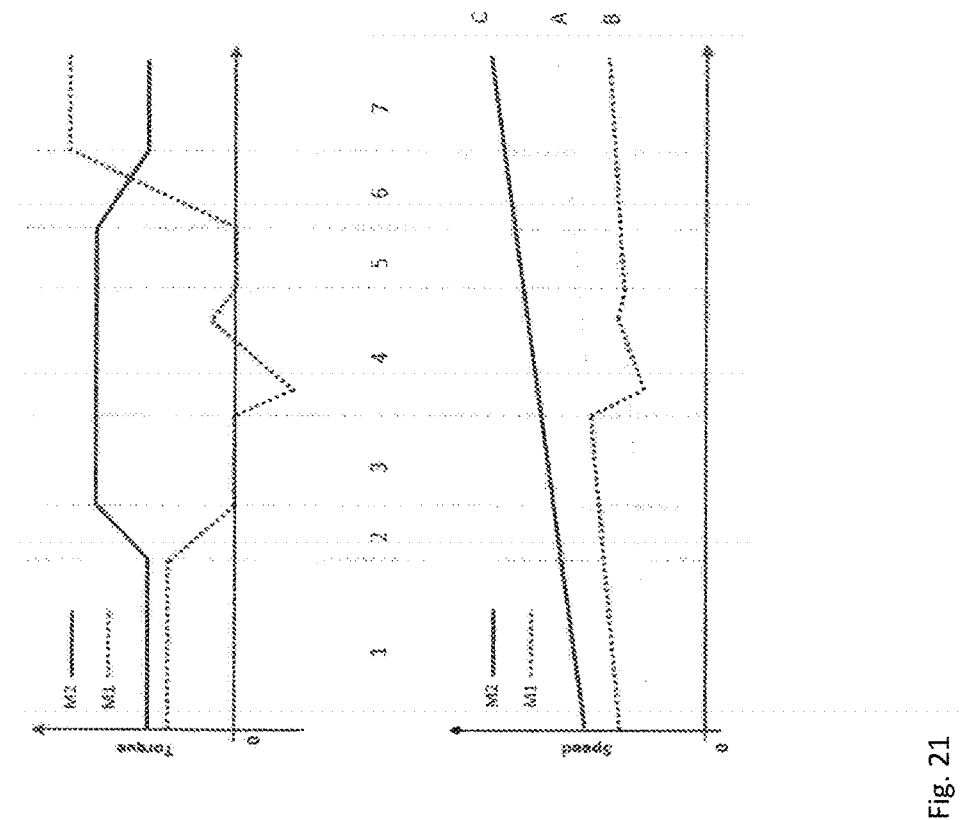
FIGS. 21 to 28 illustrate a power on up shift in the drive train of FIG. 1 for a dual motor state to a dual motor state.
Figure 21:
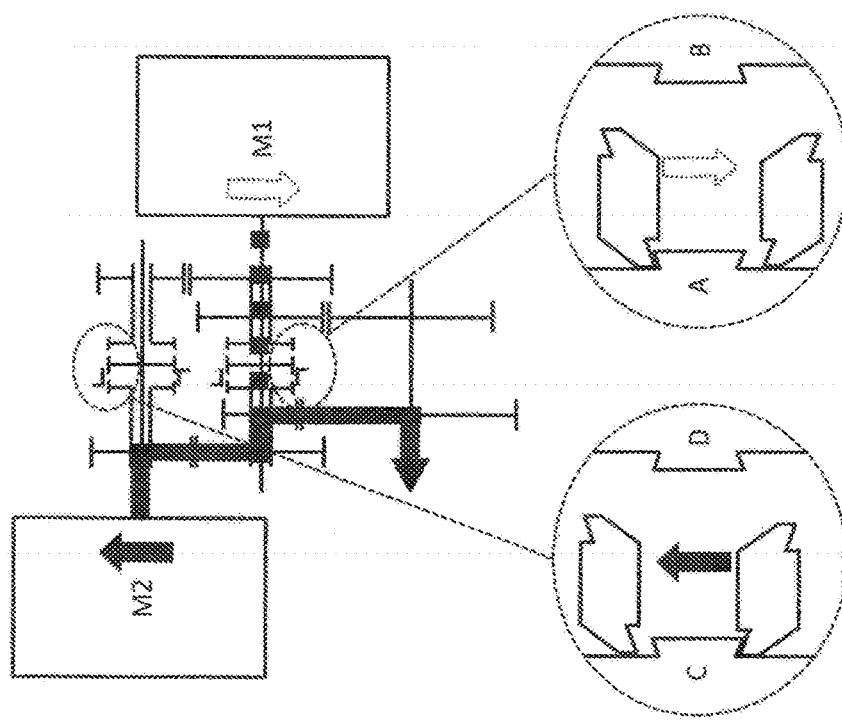

FIGS. 14 to 20 illustrate a power on up shift for a first single motor operating state (operational state 4) to a second single motor operating state (operational state 2). FIG. 15 shows the drive train 1 in operational state 4, wherein the output shaft 7 is driven by the second electric motor M2 only. The first gear selector assembly 37 is in a neutral state. The second gear selector assembly 39 is fully engaged with the fourth sleeve 87. Torque is provided from the second electric motor M2 to the output shaft via the second and fourth gear trains 15, 27. During a gear shift to operational state 2, the first electric motor M1 is activated and is synchronised to the rotational speed of the second sleeve 35. This has the effect of synchronising the rotational speed of the first input shaft 3 and the engagement members 45, 46 of the first gear selector assembly 37 with the rotational speed of the second sleeve 35 (see FIG. 16). The first gear selector assembly 37 engages the second sleeve 35. The first gear selector assembly 37 engages the second sleeve 35 initially with one of the first and second sets of engagement members 45, 46 and then follows up with the other of the first and second sets of engagement members thereby locking the second sleeve 35 for rotation with the first input shaft 3 in forward and reverse torque directions (see FIG. 17). Torque is provided from the first electric motor M1 to the output shaft via the fourth gear train 27. At this stage, torque is temporarily provided to the output shaft 7 by both the first and second electric motors M1, M2 (see FIG. 18). When the first gear selector assembly 37 engages the second sleeve 35, the loaded set of engagement members 45, 46 of the second gear selector assembly 39 becomes unloaded and the second gear selector assembly 39 then disengages the fourth sleeve 87, effectively disconnecting the second electric motor M2 from the output shaft 7 (see FIG. 19). It can be seen from the torque graph in FIG. 19, that during the handover of torque from the second electric motor M2 to the first electric motor M1 torque is continuously provided to the output shaft 7. FIG. 20 illustrates the completed gear shift and driving in operational state 2, and the second electric motor M2 moving towards an inactive state.

Figure 22:
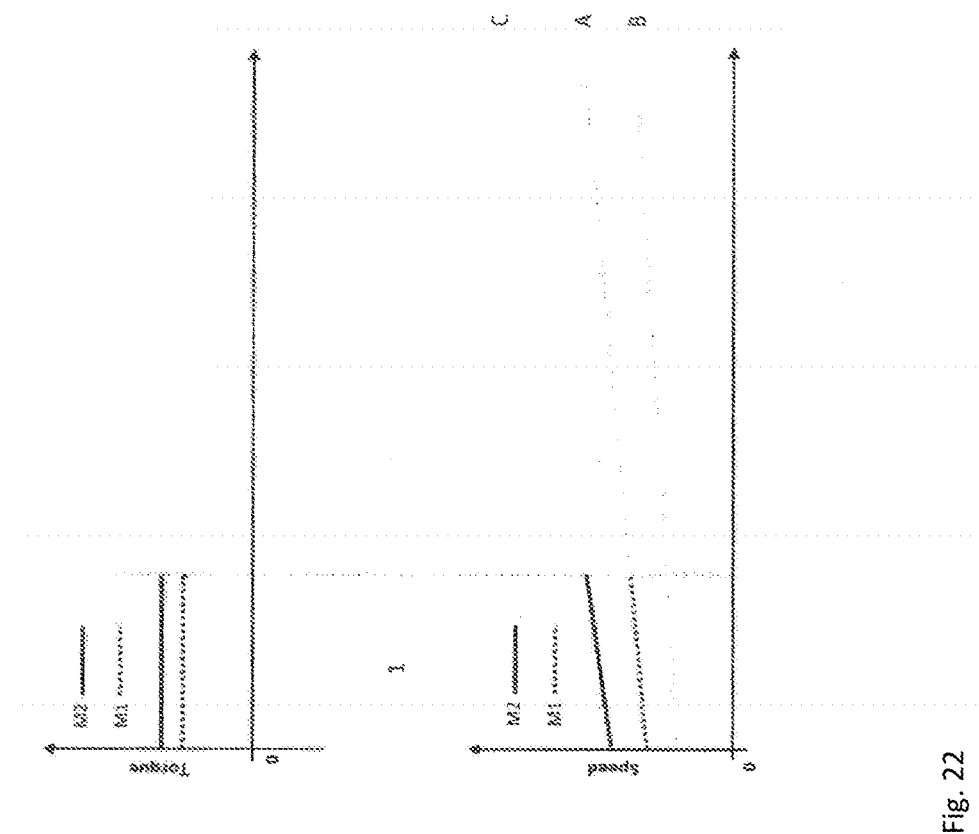
Figure 22:
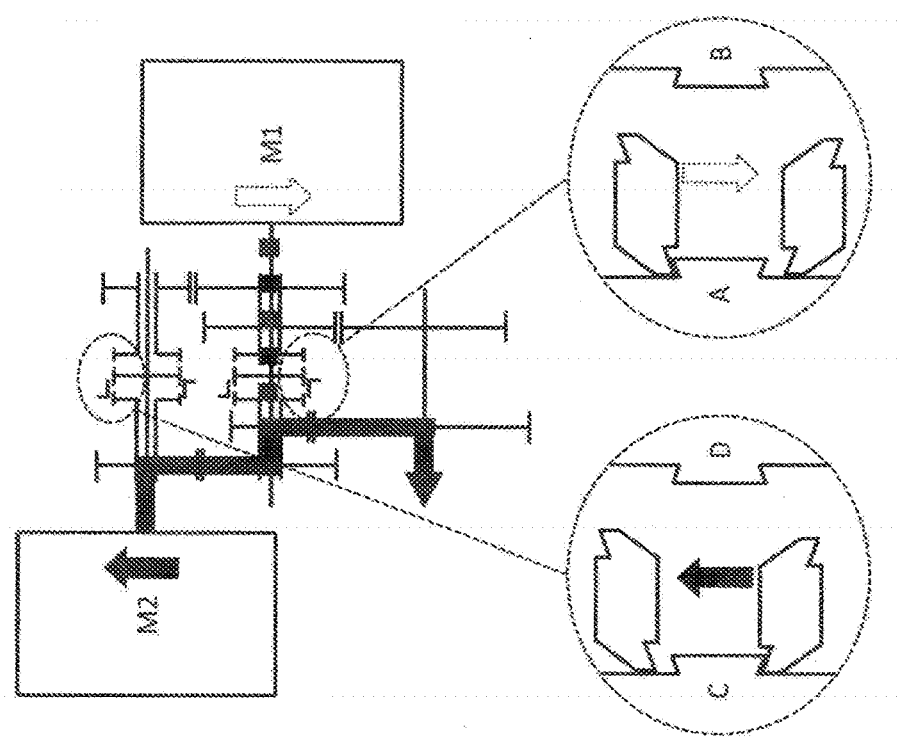
Figure 23:
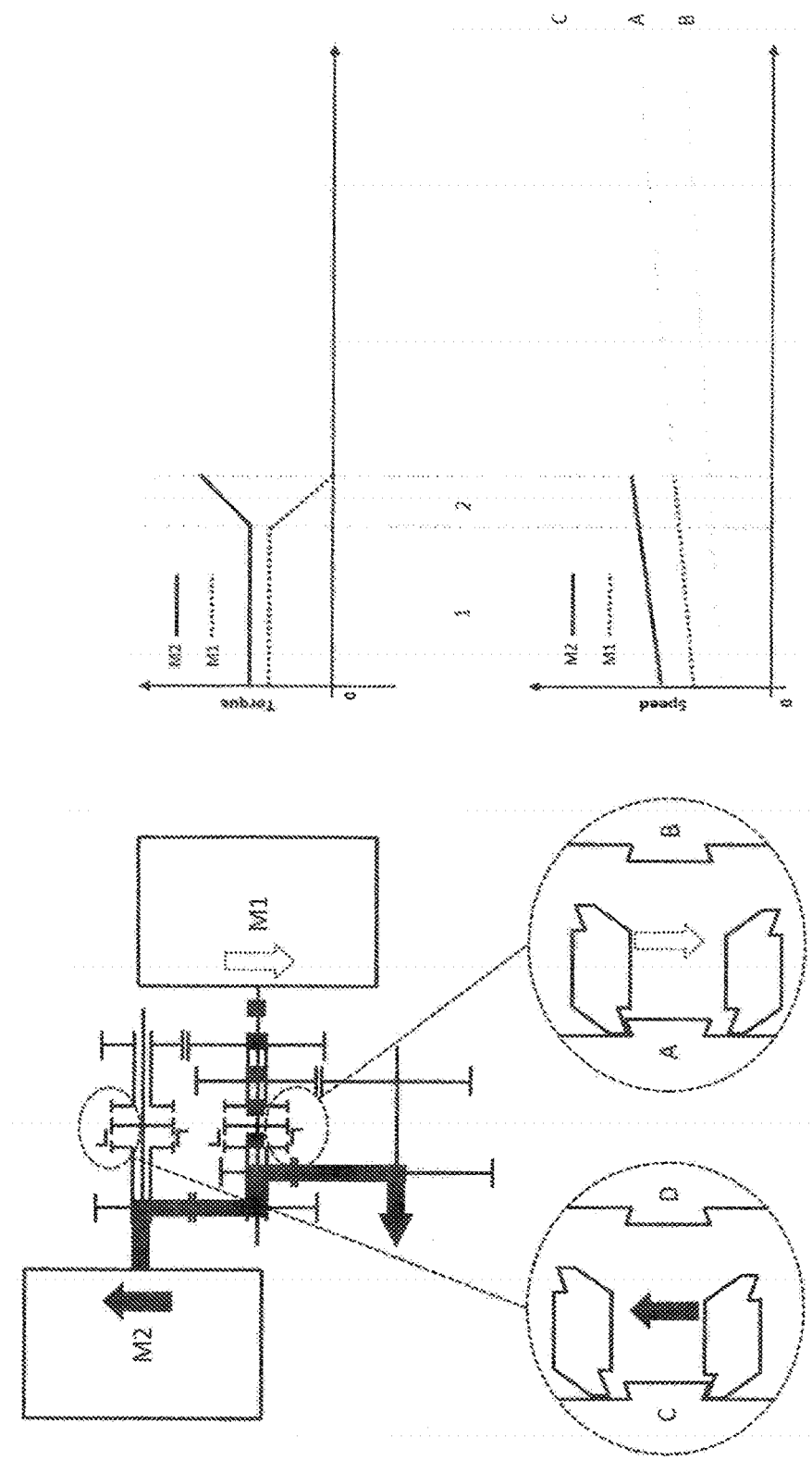
Figure 24:
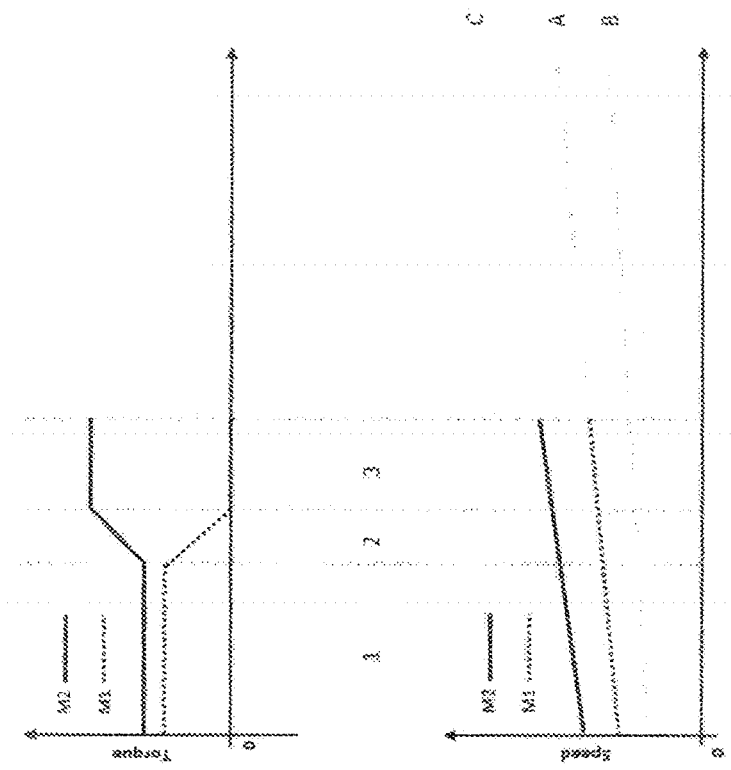
Figure 24:
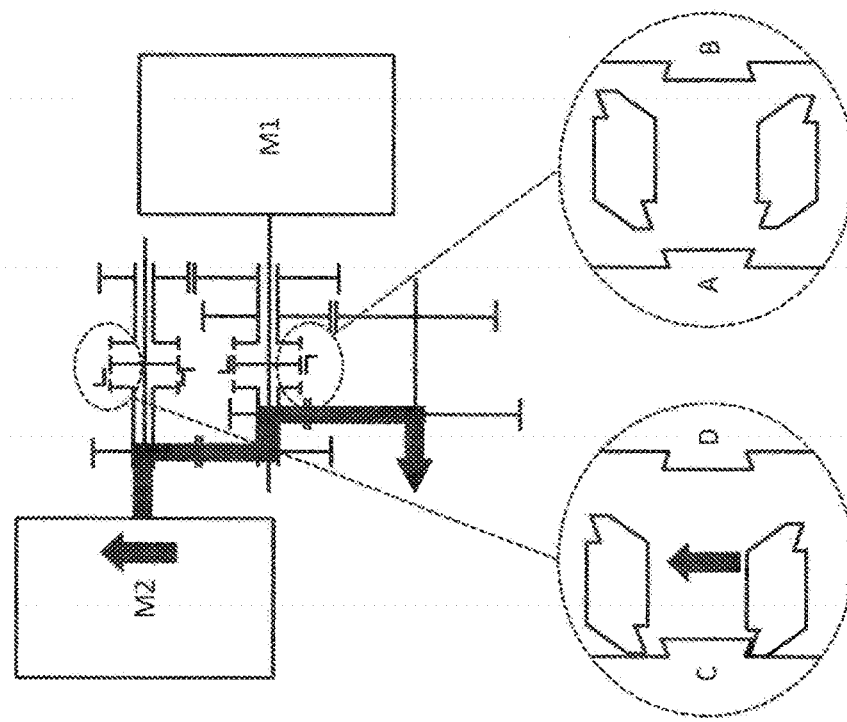
Figure 25:
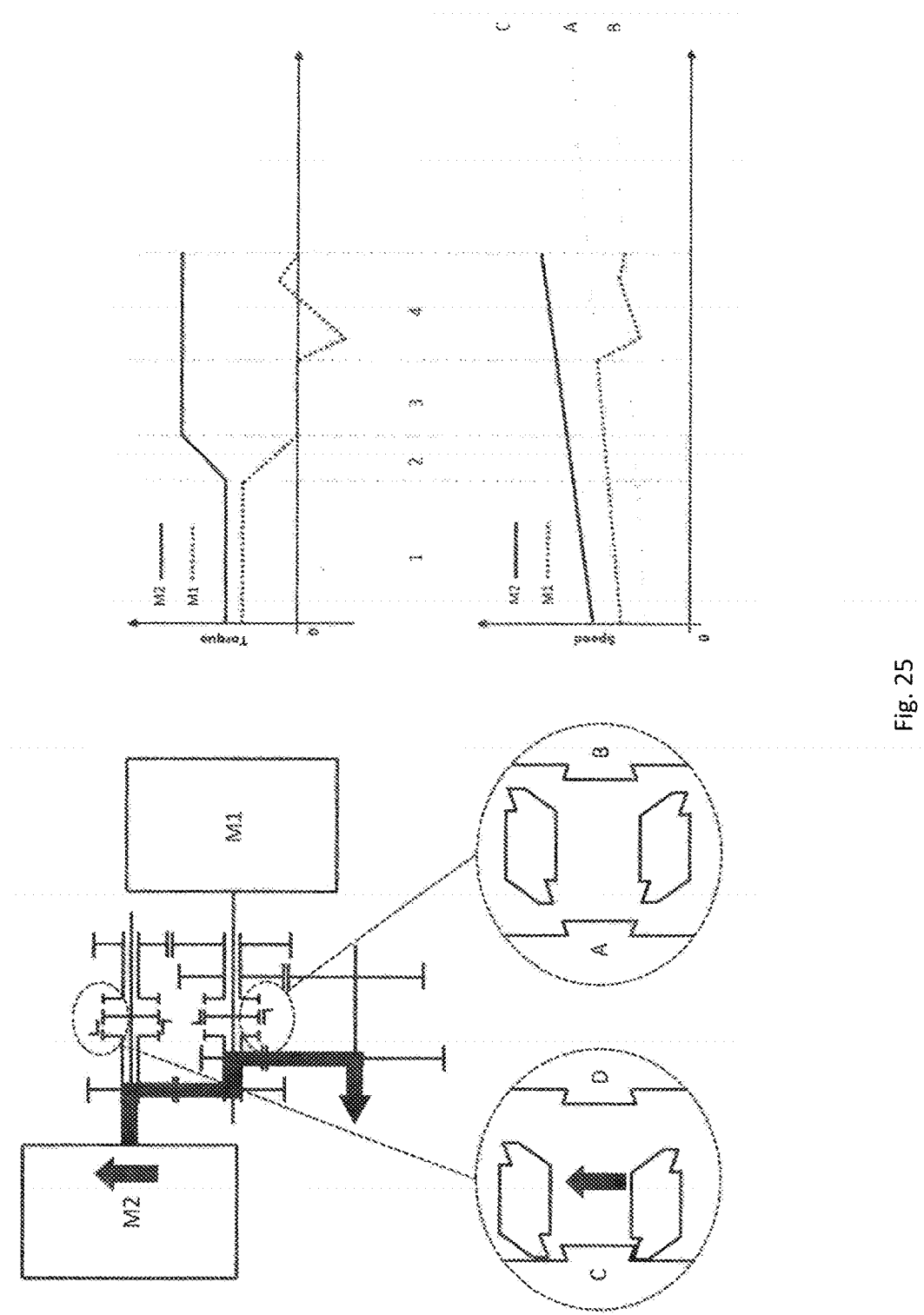
Figure 26:
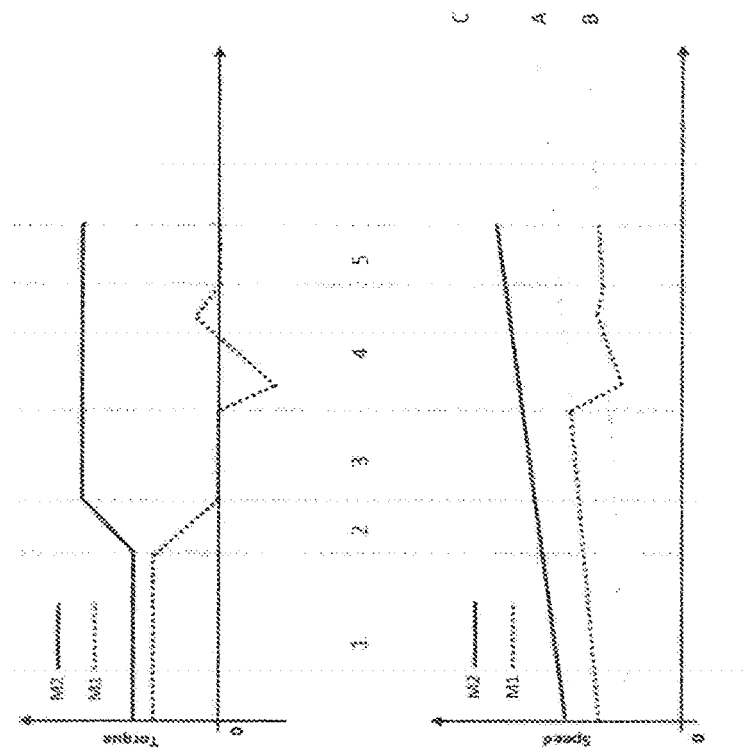
Figure 26:
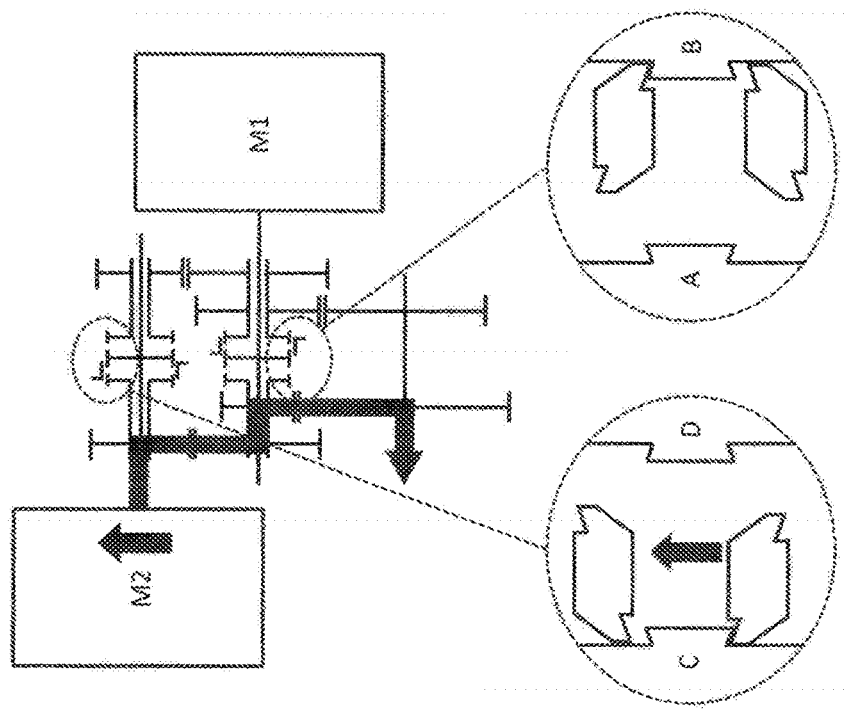
Figure 27:
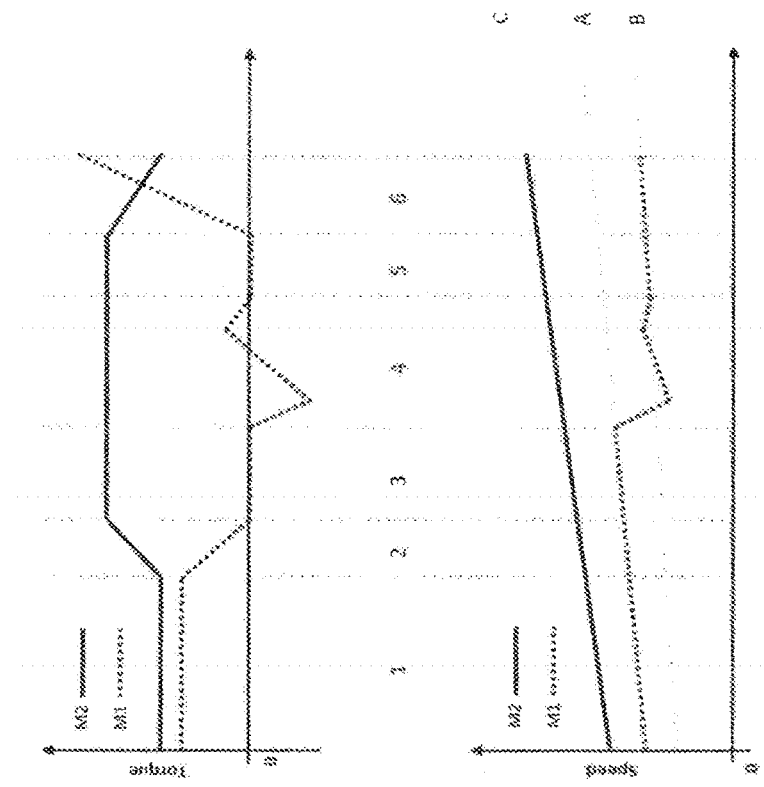
Figure 27:
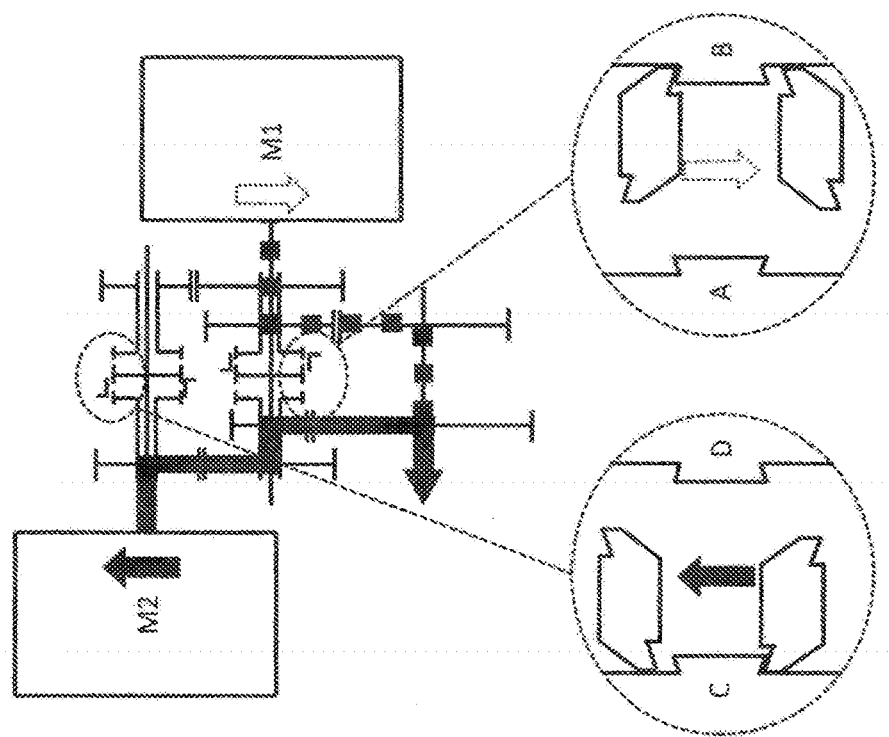
Figure 28:
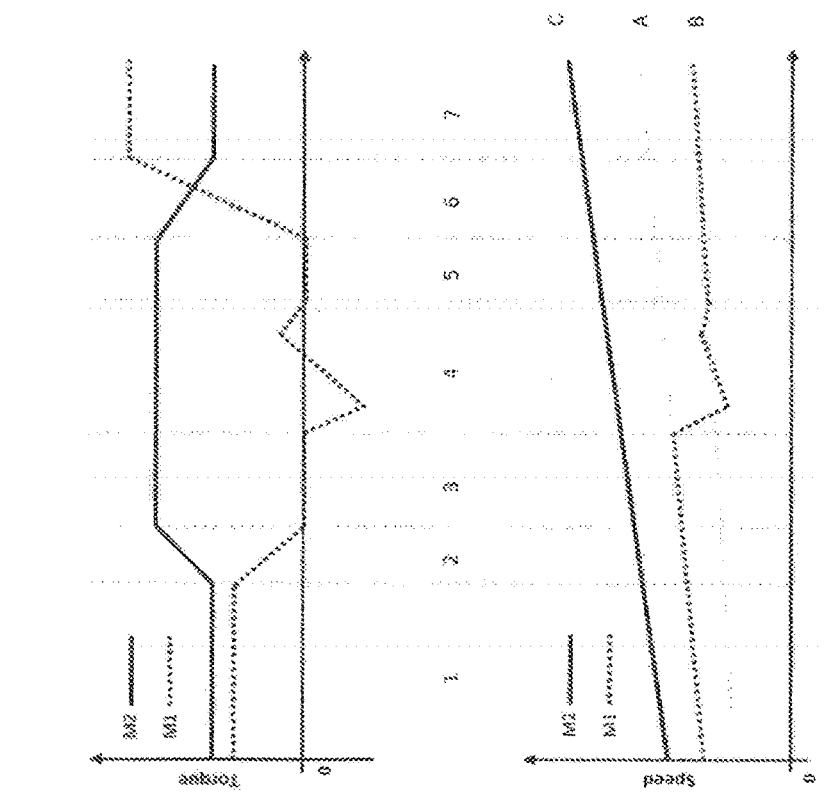
Figure 28:
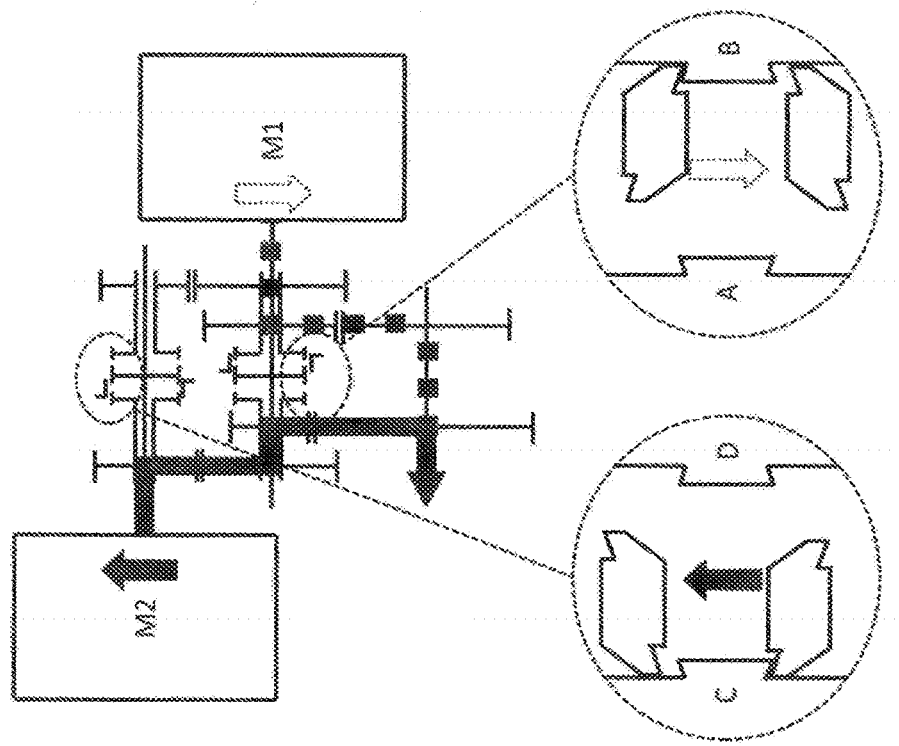

FIGS. 21 to 28 illustrate a power on up shift for a first dual motor operating state (operational state 9) to a second dual motor operating state (operational state 8). FIG. 22 shows the drive train 1 in operational state 9, wherein the output shaft 7 is driven by both the first and second electric motors M1, M2. The first gear selector assembly 37 is fully engaged with the second sleeve 35. Torque is provided from the first electric motor M1 to the output shaft 7 via the fourth gear train 27. The second gear selector assembly 39 is fully engaged with the fourth sleeve 87. Torque is provided from the second electric motor M2 to the output shaft 7 via the second and fourth gear trains 15, 27. During a gear shift to operational state 8, torque output from the second electric motor M2 is increased, while simultaneously the torque output from the first electric motor M1 is decreased (see FIG. 23). This unloads the loaded set of engagement members 45, 46, and the first gear selector assembly 37 disengages the second sleeve 35, moving to a neutral position (see FIG. 24), thus temporarily no torque is supplied to the output shaft 7 by the first electric motor M1. The speed of the first electric motor M1 is then synchronised with the rotational speed of the first sleeve 33 (see FIG. 25). The first gear selector assembly 37 then engages the first sleeve 33. The first gear selector assembly 37 initially engages the first sleeve 33 with one of the first and second sets of engagement members 45, 46, and then follows up with the other of the first and second sets of engagement members 45, 46 to fully engage the first sleeve 33 (see FIG. 26). Torque is then supplied from the first electric motor M1 to the output shaft via the third gear train 21 (see FIG. 27). It can be seen from the torque graph in FIG. 27, that despite torque from the first electric motor M1 being temporarily disconnected from the output shaft 7 during the change of gear train from the fourth gear train 27 to the third gear train 21, torque is continuously provided to the output shaft 7 by the second electric motor M2. FIG. 28 illustrates the completed gear shift and driving in operational state 8 wherein torque is supplied to the output shaft 7 by both the first and second electric motors M1, M2 simultaneously.

Other shift types can be undertaken in a similar fashion.

It will be appreciated that torque spikes are substantially eliminated by the speed synchronisation steps in the shift strategies prior to engaging the new gear. Synchronisation is possible because the transmission layout provides two drive input paths: one directly from the first electric motor M1 and the other directly from the second electric motor M2.

The drive train can be used in vehicle and non-vehicle applications. Typical vehicles include cars, lorries, motorcycles, buses, vans, all-wheel drive vehicles, tractors, construction vehicles, and excavation vehicles. Non-vehicle applications include manufacturing machines, wind turbines, etc.

Figure 29:
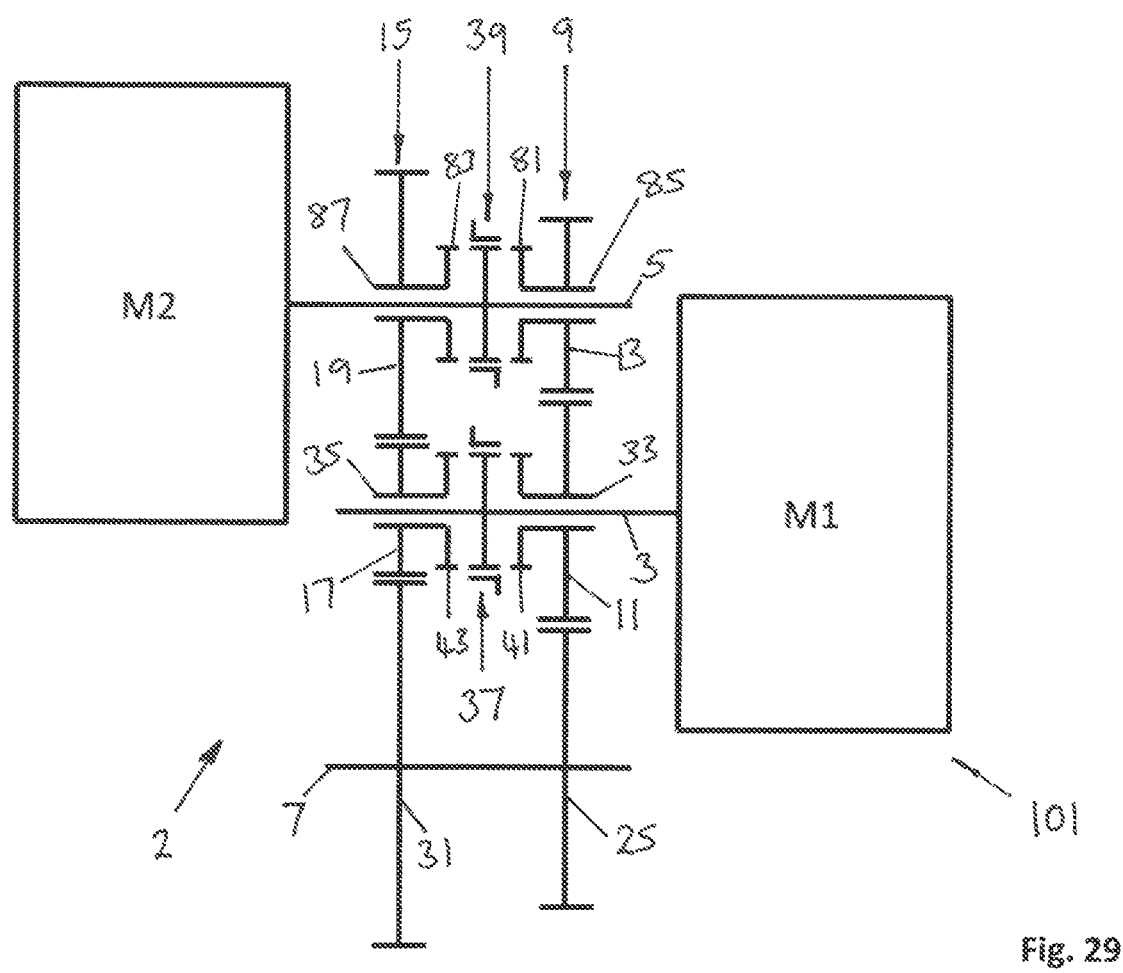
FIG. 29 is a schematic of a drive train in accordance with a second embodiment, the drive train including first and second electric motors and a transmission system.

A drive train 101 according to a second embodiment is shown in FIG. 29. The second embodiment is similar to the first embodiment except in the following respects. Rather than having third and fourth gear trains 21, 27, the gear elements 25, 35 mounted on the output shaft 7 are part of the first and second gear trains 9, 15 respectively. That is, the first gear train 9 includes the gear element 11 rotatably mounted on the first input shaft 3, the gear element 13 rotatably mounted on the second input shaft 5 and the gear element 25 fixed for rotation with the output shaft 7. The second gear train 15 includes the gear element 17 rotatably mounted on the first input shaft 3, the gear element 19 rotatably mounted on the second input shaft 5 and the gear element 31 fixed for rotation with the output shaft 7.

Figure 4:
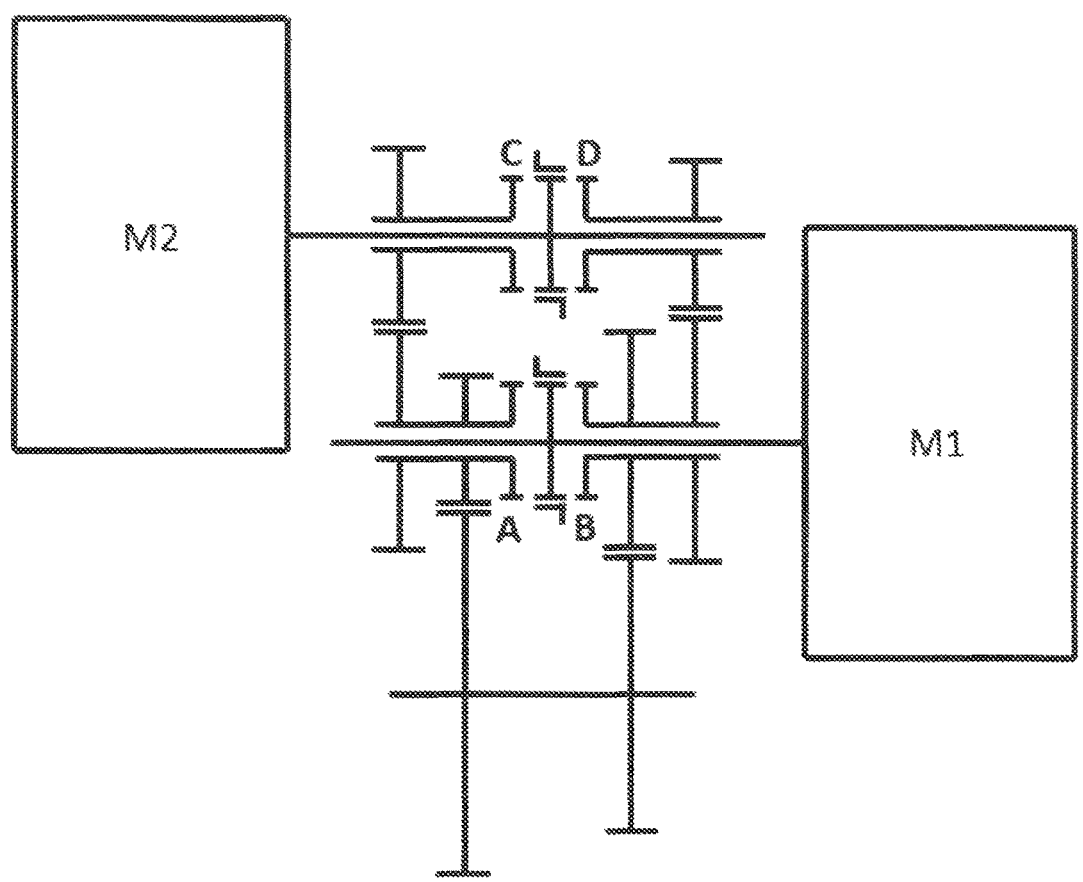
FIGS. 4 to 13 illustrate operating states of the drive train of FIG. 1.
Figure 5:
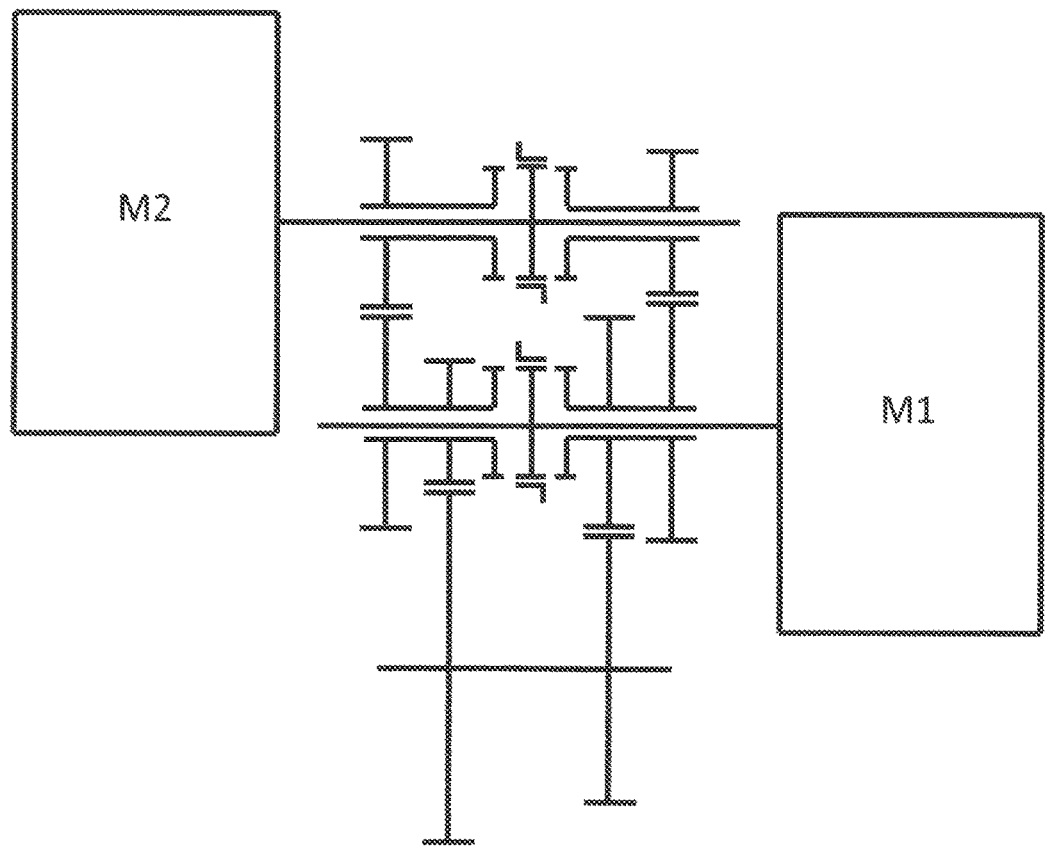
Figure 6:
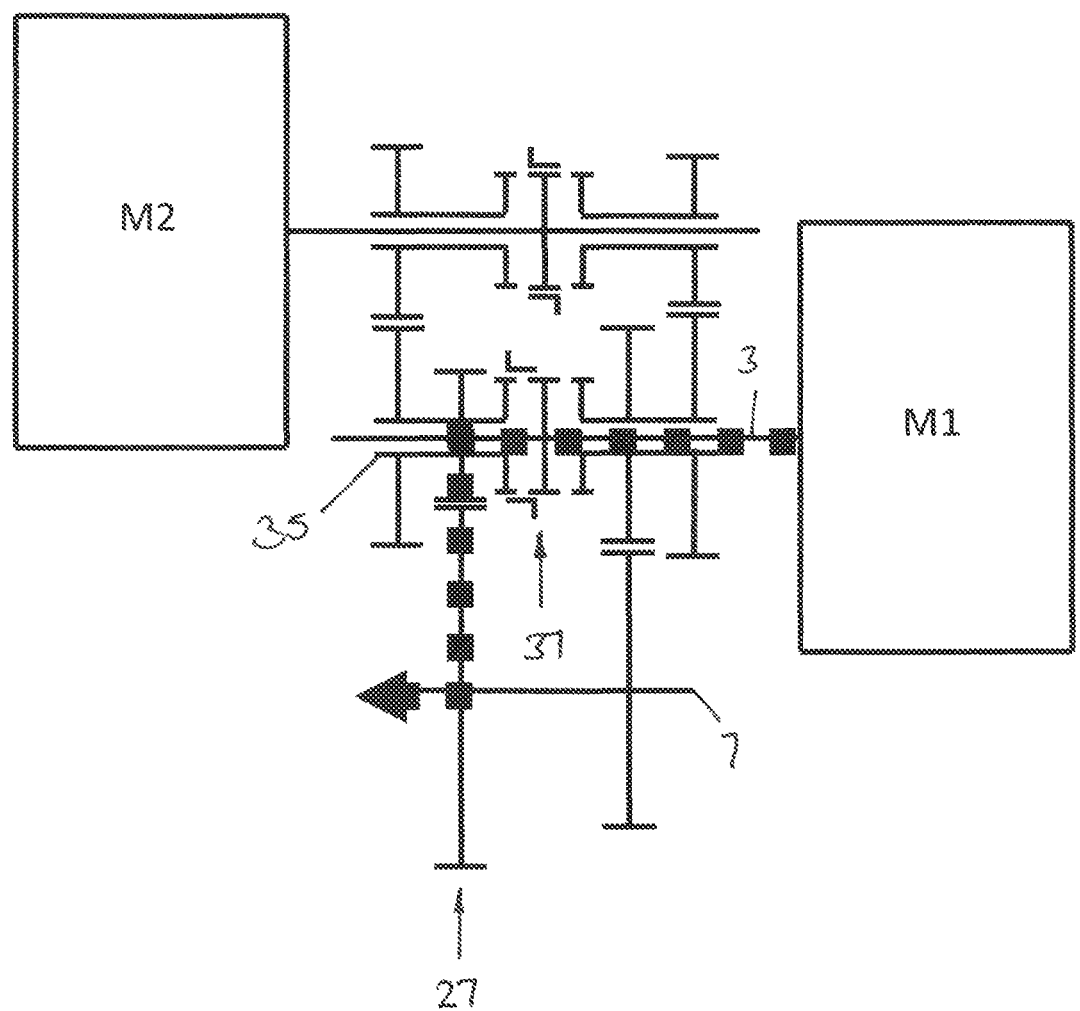
Figure 7:
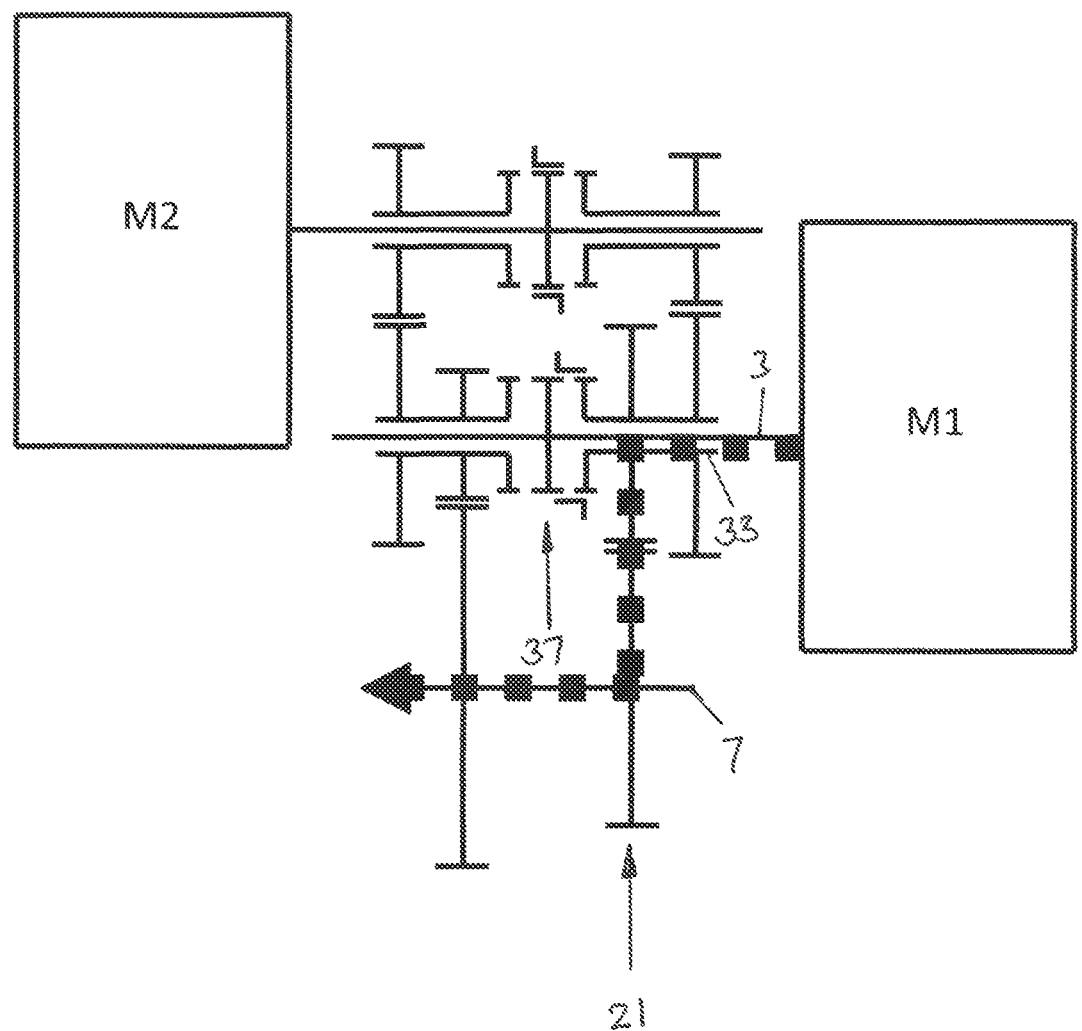
Figure 8:
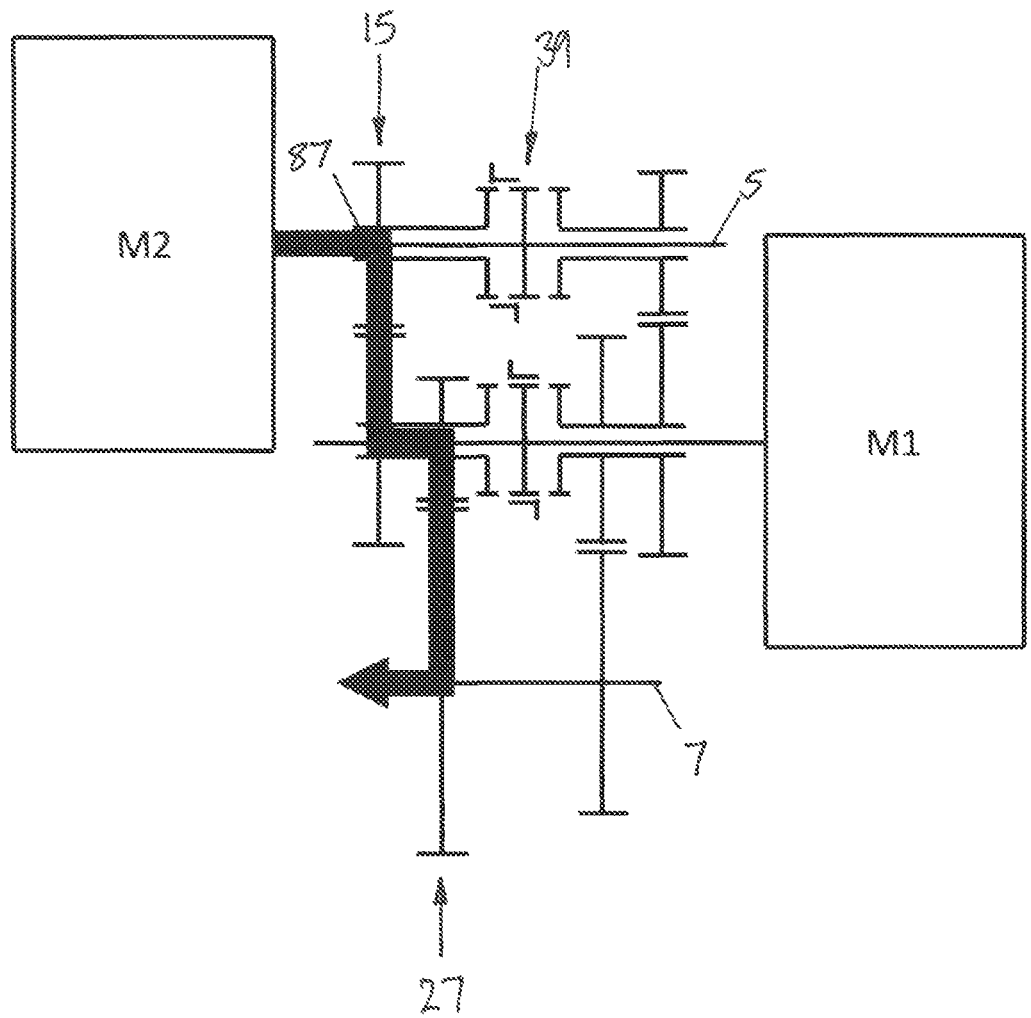
Figure 9:
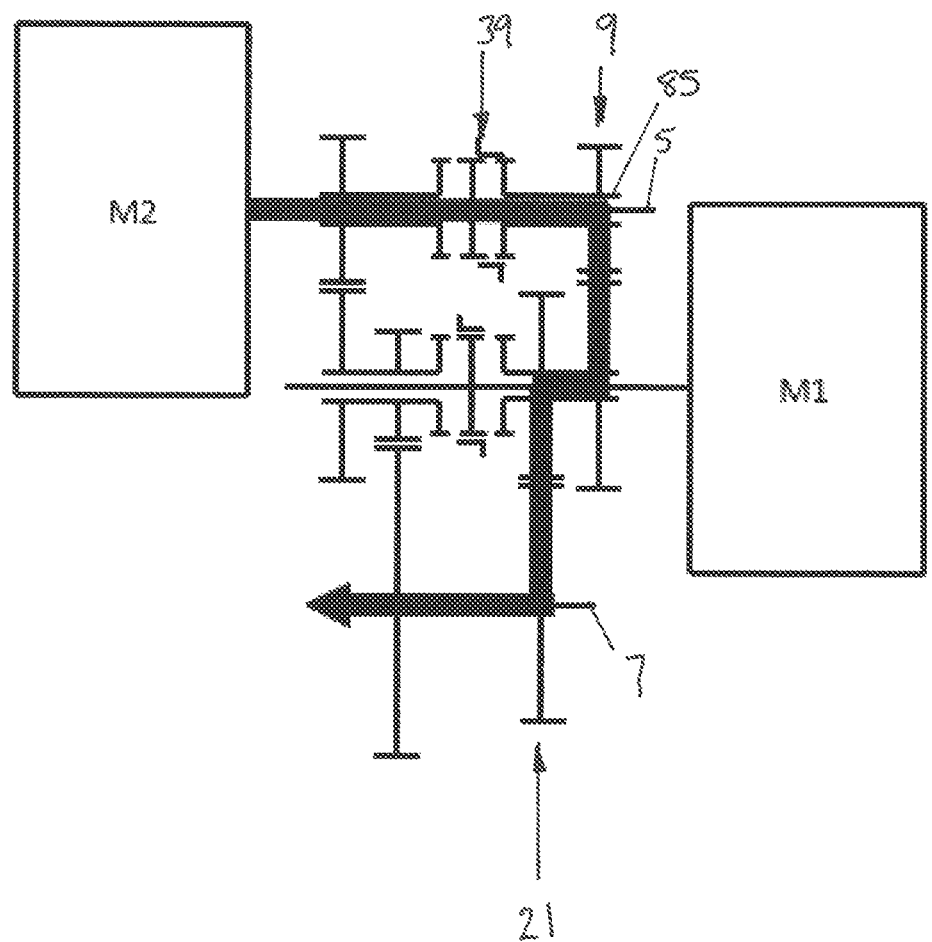
Figure 10:
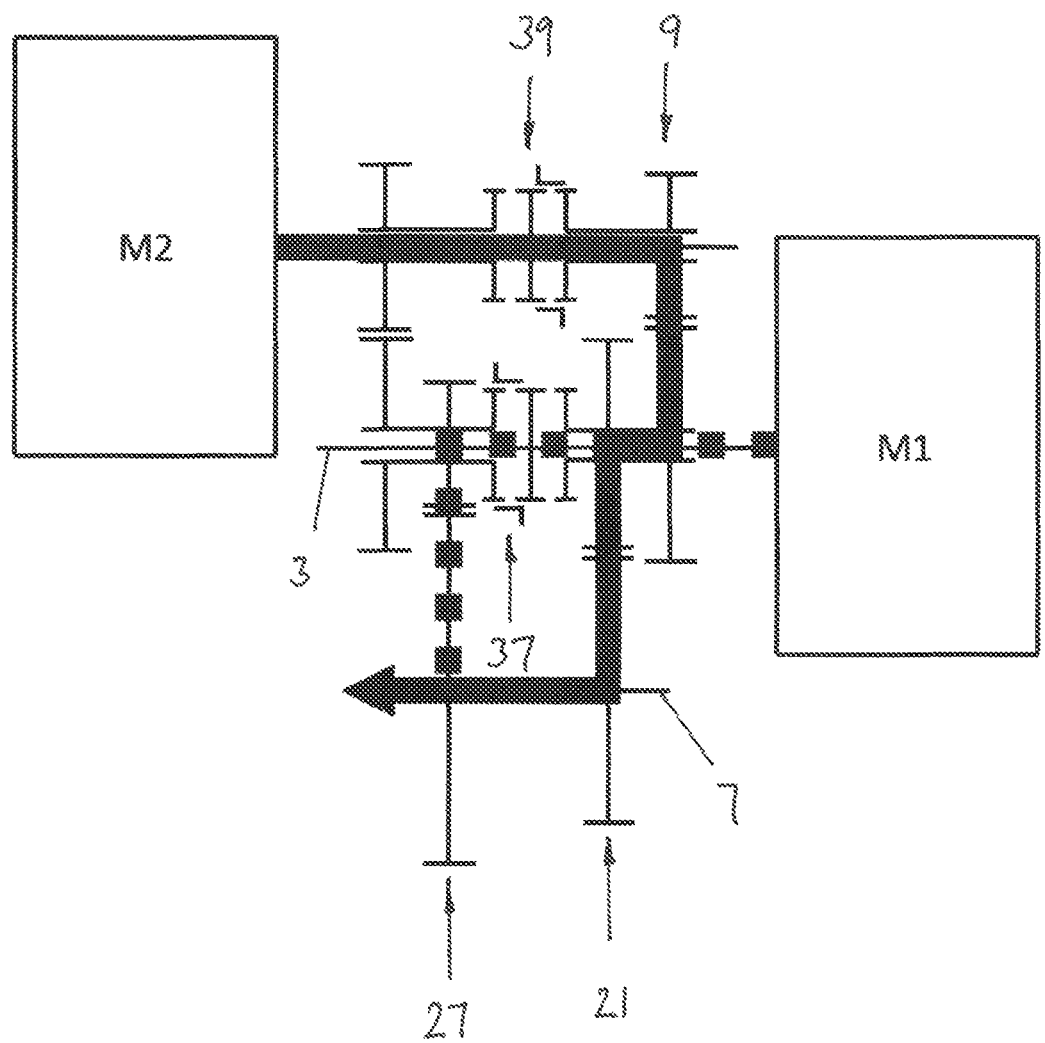
Figure 11:
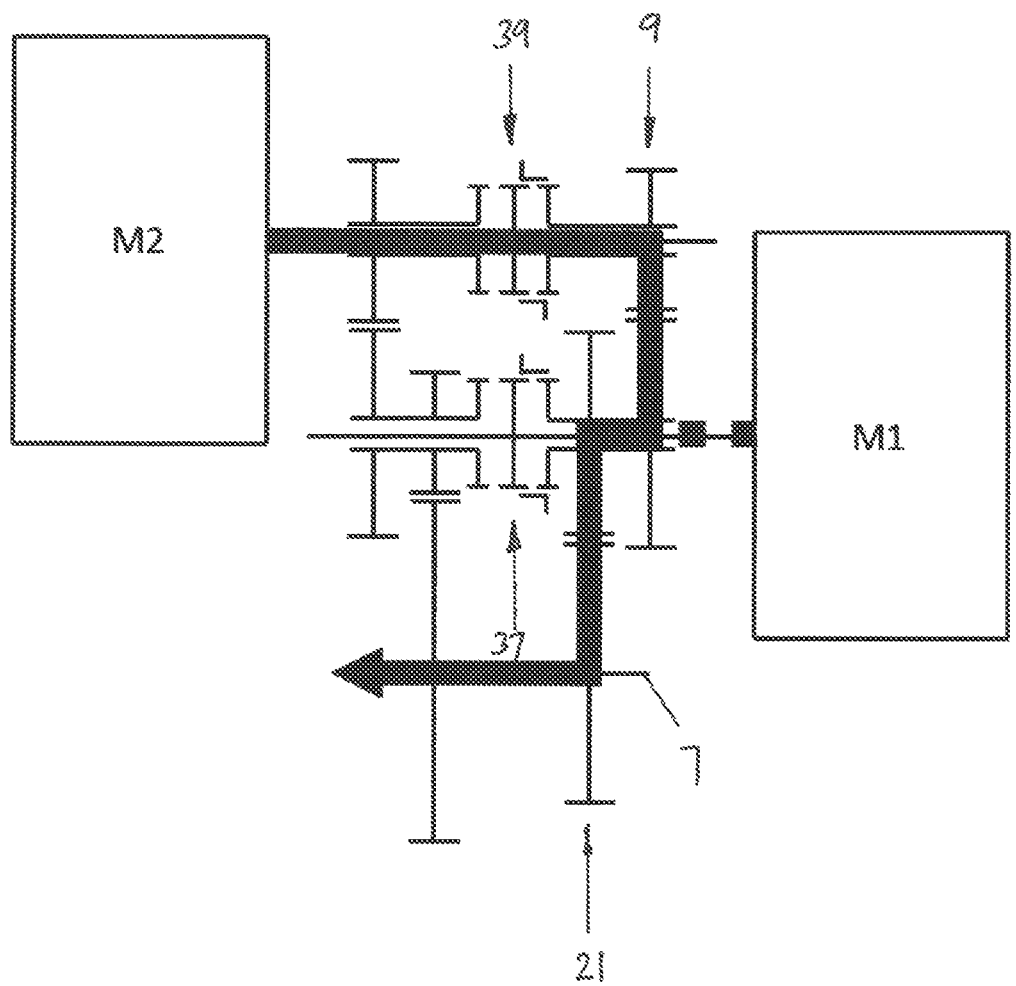
Figure 12:
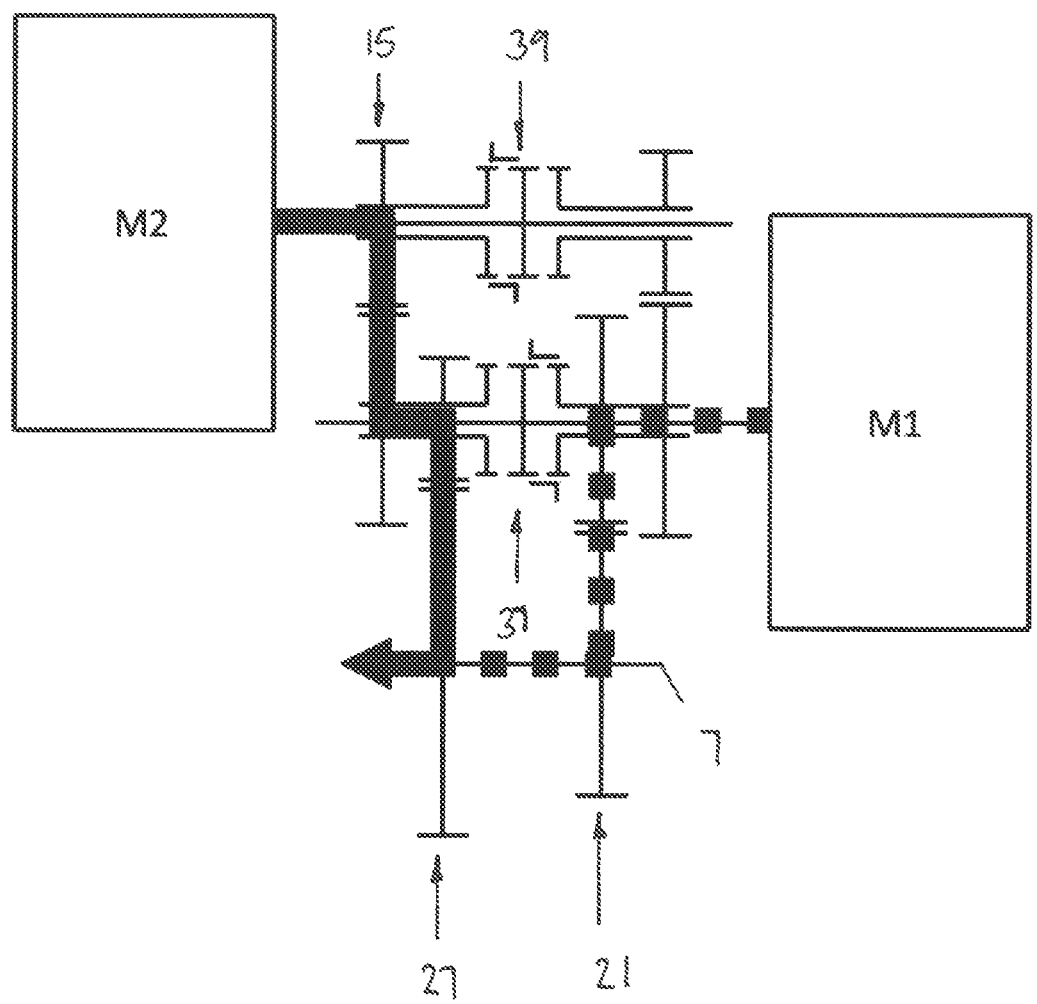
Figure 13:
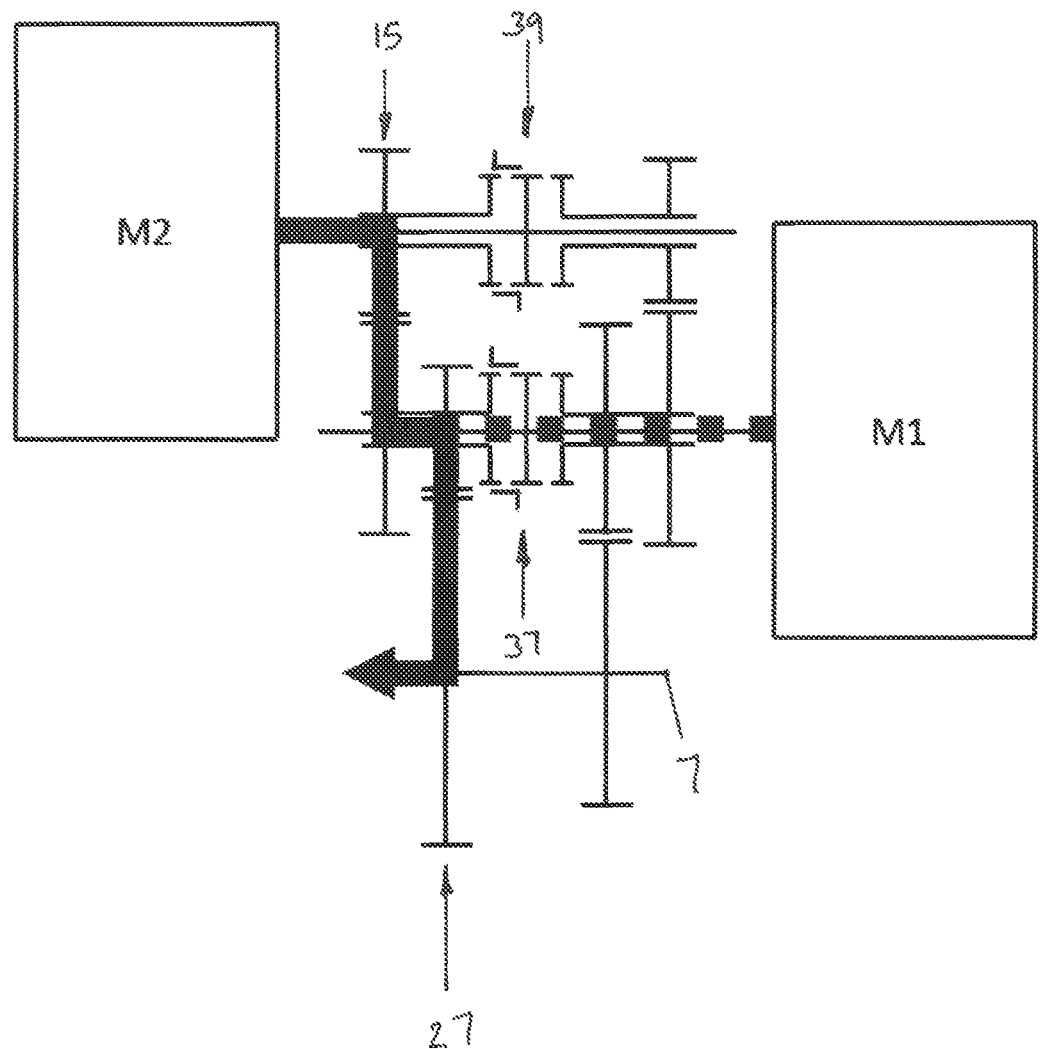
Figure 14:
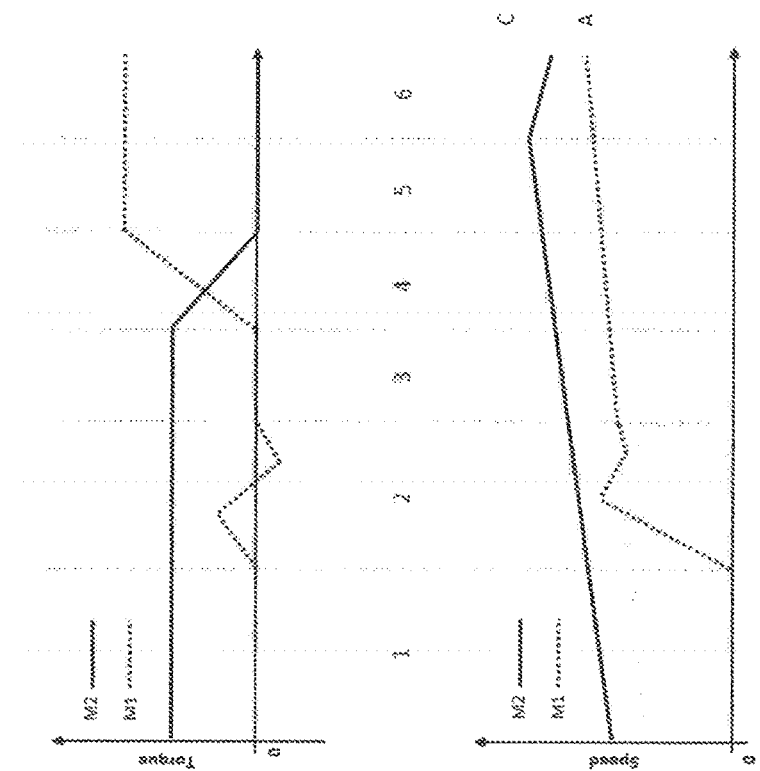
FIGS. 14 to 20 illustrate a power on up shift in the drive train of FIG. 1 for a single motor state to a single motor state.
Figure 14:
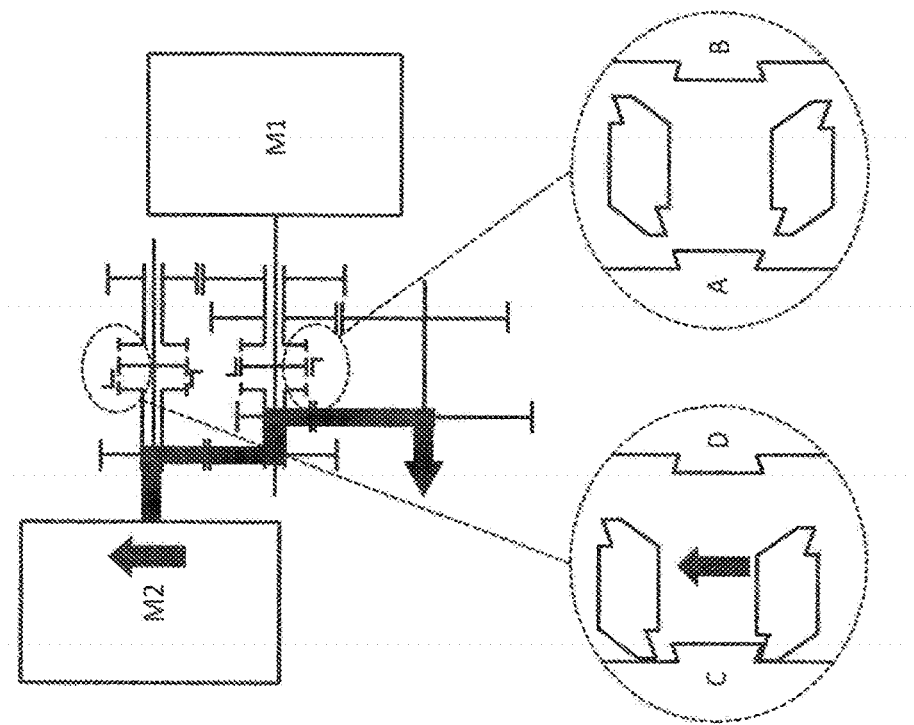

The second embodiment has the same operational states as the first embodiment outlined shown in the table of FIG. 4, however some of the torque paths differ from the first embodiment due to the absence of the third and fourth gear trains.

The second embodiment is a simplified, more compact, version of the first embodiment, however it has less flexibility in selection of the relative sizes of the gear elements than the first embodiment and there is less flexibility in the selection of the relative output powers of the first and second electric motors M1, M2. That is, the first embodiment provides greater flexibility to fine tune the selection of the relative sizes of the gear elements, and the relative output powers of the first and second electric motors M1, M2, for example to better suit one of the two motors M1, M2 for the purposes of rapid acceleration or for the purposes of energy efficient driving.

Figure 30:
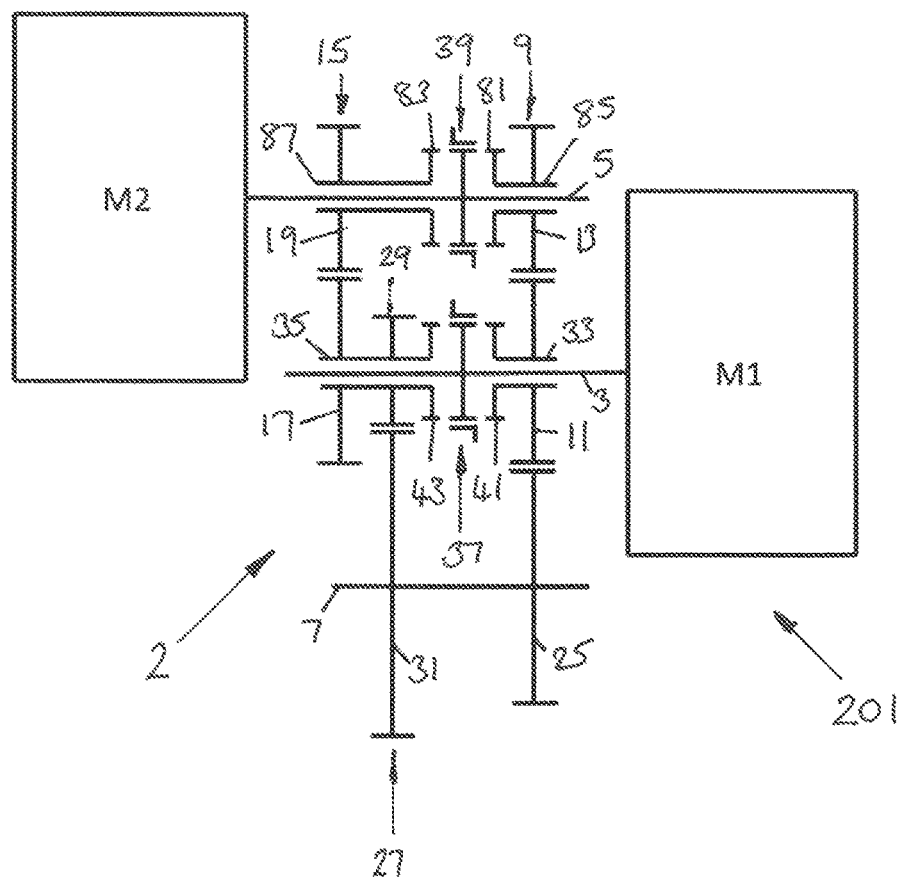
FIG. 30 is a schematic of a drive train in accordance with a third embodiment, the drive train including first and second electric motors and a transmission system.

A drive train 201 according to a third embodiment is shown in FIG. 30. The third embodiment is a hybrid version of the first and second embodiments. Rather than having the third gear train 21, the gear element 25 mounted on the output shaft 7 is part of the first gear train 9. That is, the first gear train 9 includes the gear element 11 rotatably mounted on the first input shaft 3, the gear element 13 rotatably mounted on the second input shaft 5 and the gear element 25 fixed for rotation with the output shaft 7. However, differing from the second embodiment, the third embodiment has a similar arrangement with respect to the second and fourth gear trains 15, 27 as the first embodiment.

The third embodiment has the same operational states as the first embodiment outlined shown in the table of FIG. 4, however some of the torque paths differ from the first embodiment due to the absence of the third gear train.

A variation of the third embodiment, that is not illustrated, is similar to the third embodiment except that it includes first and third gear trains 9, 21 of the first embodiment and the second gear train 15 of the second embodiment. The variation of the third embodiment has the same operational states as the first embodiment outlined shown in the table of FIG. 4, however some of the torque paths differ from the first embodiment due to the absence of the fourth gear train.

The third embodiment has more flexibility than the second embodiment to select the relative sizes of the gear elements, and the relative output powers of the first and second motors M1, M2, but not as much flexibility as the first embodiment. However, third embodiment is more compact than the first embodiment.

Figure 31:
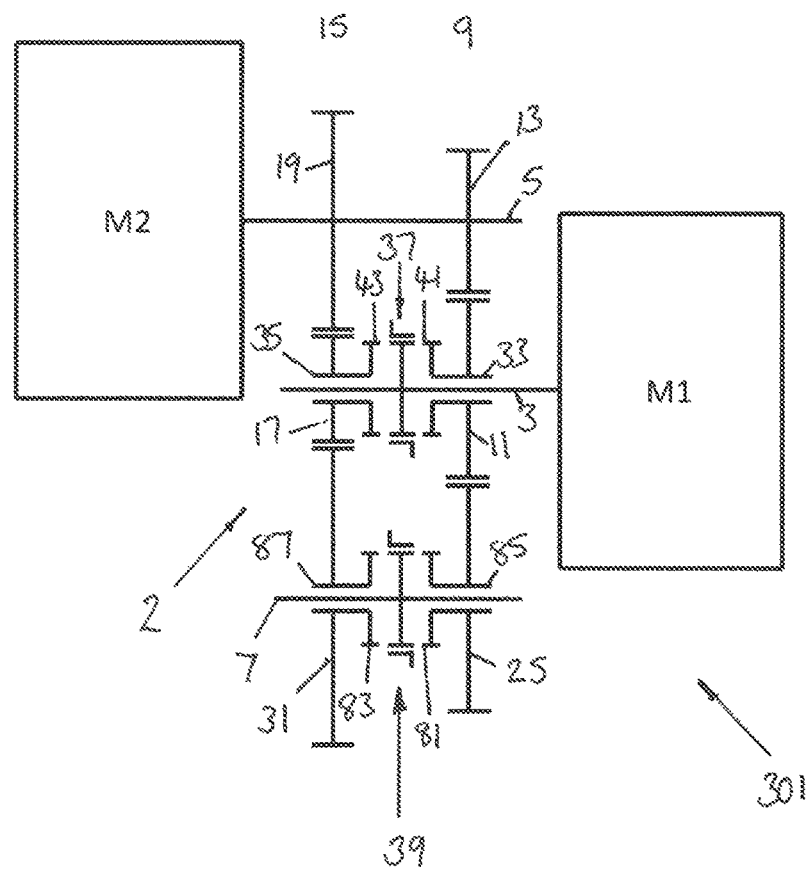
FIG. 31 is a schematic of a drive train in accordance with a fourth embodiment, the drive train including first and second electric motors and a transmission system.

A drive train 301 according to a fourth embodiment is shown in FIG. 31. The fourth embodiment is similar to the second embodiment except that the second gear selector assembly 39 is mounted on the output shaft 7 instead of the second input shaft 5. The gear elements 13 and 19 are fixed for rotation with the second input shaft 5. The gear elements 25 and 31 are rotatably mounted on the output shaft 7. The second gear selector assembly 39 is arranged to selectively lock the gear elements 25 and 31 for rotation with the output shaft 7.

Figure 32:
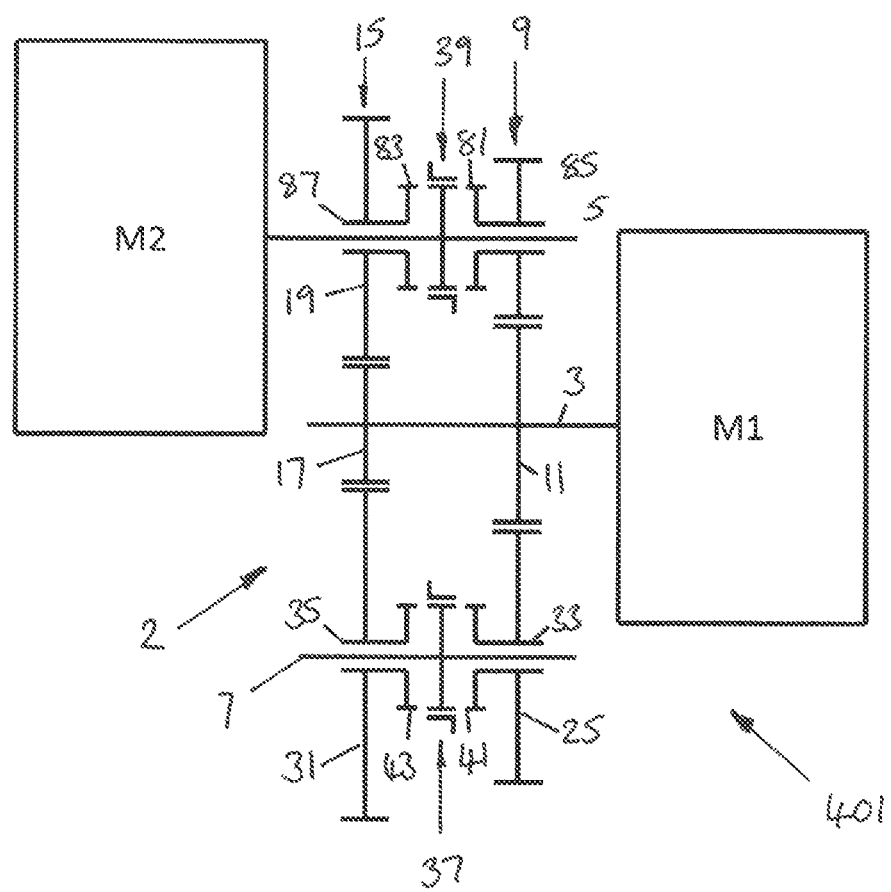
FIG. 32 is a schematic of a drive train in accordance with a fifth embodiment, the drive train including first and second electric motors and a transmission system.

A drive train 401 according to a fifth embodiment is shown in FIG. 32. The fifth embodiment is similar to the second embodiment except that the first gear selector assembly 37 is mounted on the output shaft 7 instead of the first input shaft 3. The gear elements 11 and 17 are fixed for rotation with the first input shaft 3. The gear elements 25 and 31 are rotatably mounted on the output shaft 7. The first gear selector assembly 37 is arranged to selectively lock the gear elements 25 and 31 for rotation with the output shaft 7.

The fourth and fifth embodiments each have 11 states, 10 operational states and neutral, which is more states than the first to third embodiments. However a downside to the fourth and fifth embodiments is that when shifting between at least some of the operational states there is a risk of torque spikes occurring since it not always possible to synchronise the speed of one of the motors to the new gear as effectively as in the first to third embodiments. For at least some shifts, at least one of the gear selector assemblies 37, 39 engages a new gear element while a current gear element is still engaged, and since there is a speed difference between the newly engaged gear element and the motor M1, M2 driving the selector assembly 37, 39, torque spikes can occur.

It will be appreciated by the skilled person that modifications can be made to the above-mentioned embodiments that fall within the scope of the claims, for example in some embodiments, only one of the gear selector assemblies is of the type described above. The other gear selector assembly can be a conventional dog or synchromesh selector assembly. However it is preferable to have each of the gear selector assemblies as the type described above because there are gear selection advantages such as early engagement of the gear element without fear of transmission lockup, compact arrangement and no requirement for synchronising cones, which are expensive.

In some embodiments, both of the first and second selector assemblies can be of a conventional type, such as a synchromesh or dog type gear selector assembly. However, in such an arrangement the advantages of having a selector assembly of the type described above are lost, and typically the transmission may not be as compact, particularly if synchronisers are used.

In some embodiments, the first and second motors M1, M2 are similar. In other embodiments the first and second motors M1, M2 are different. For example, one of the first and second motors M1, M2 can have characteristics that are better suited to fast acceleration, low speeds and launching a vehicle. One of the first and second motors M1, M2 can have characteristics that are better suited to cruising speeds, for example for motorway driving.

The actuator mechanism 47 can be arranged differently from that described above. For example, the actuator mechanism can include first and second actuators and first and second actuator members. The first and second actuators can be force generator actuators and preferably part of an electrical system for example, an electro-mechanical system or an electro-hydraulic system. The first and second actuator members are mechanical drive members that transmit force from the first and second actuators to the sets of engagement members and are preferably in the form of independently controllable shift forks. The first set of engagement members 45 is driven by the first actuator via the first shift fork and the second set of engagement members 46 is driven by the second actuator via the second shift fork. Thus the first and second sets of engagement members 45, 46 move totally independently of each other.

In some arrangements, for at least one gear element in the transmission, instead of having the drive formations mounted on an associated component (the sleeve), the drive formations can be formed on or attached directly to the gear element.

The invention claimed is:
1. A drive train, comprising:
a first electric motor; a second electric motor; and
a transmission system including a first input shaft driveably connected to the first electric motor, a second input shaft driveably connected to the second electric motor, an output member, a first gear train including a first gear element rotatably mounted on the first input shaft and a second gear element rotatably mounted on the second input shaft, wherein the first gear element meshes with the second gear element, a second gear train including a third gear element rotatably mounted on the first input shaft and a fourth gear element rotatably mounted on the second input shaft, wherein the third gear element meshes with the fourth gear element, a gear selector assembly arranged to selectively lock the first and third gear elements for rotation with the first input shaft, and a further gear selector assembly arranged to selectively lock the second and fourth gear elements for rotation with the second input shaft, wherein at least one of the gear selector assemblies includes first and second sets of engagement members that are moveable independently of each other and is arranged to selectively lock each of its respective gear elements for rotation with its respective input shaft from operational modes that include the following modes:
lock the gear element for rotation with the input shaft in forward and reverse torque directions, lock the gear element for rotation with the input shaft in the forward torque direction and not lock in the reverse torque direction; and
lock the gear element with rotation with the input shaft in the reverse torque direction and not lock in the forward torque direction.

2. The drive train according to claim 1, wherein the transmission system includes a gear element mounted on the output member.

3. The drive train according to claim 2, wherein the gear element mounted on the output member is part of the first gear train.

4. The drive train according to claim 2, wherein the transmission system includes a third gear train, the third gear train includes a fifth gear element rotatably mounted on the first input shaft and the gear element mounted on the output member; wherein the first and fifth gear elements are fixedly attached to a first sleeve, the first sleeve is rotatably mounted on the first input shaft, and the gear selector assembly is arranged to selectively lock the first sleeve for rotation with the first input shaft; wherein the gear selector assembly is arranged to selectively lock the first sleeve for rotation with the first input shaft from operational modes that include: lock the first sleeve for rotation with the first input shaft in forward and reverse torque directions, lock the first sleeve for rotation with the first input shaft in the forward torque direction and not lock in the reverse torque direction; and lock the first sleeve with rotation with the first input shaft in the reverse torque direction and not lock in the forward torque direction.

5. The drive train according to claim 4, wherein, in at least one operational state, torque is provided to the output member from the first electric motor via the third gear train; and/or wherein, in at least one operational state, torque is provided to the output member from the second electric motor via the third gear train.

6. The drive train according to claim 2, wherein the transmission system includes a further gear element mounted on the output member.

7. The drive train according to claim 6, wherein the further gear element mounted on the output member is part of the second gear train.

8. The drive train according to claim 6, wherein the transmission system includes a fourth gear train, the fourth gear train includes a sixth gear element rotatably mounted on the first input shaft, and the further gear element mounted on the output member; wherein the third and sixth gear elements are fixedly attached to a second sleeve, the second sleeve is rotatably mounted on the first input shaft, and the gear selector assembly is arranged to selectively lock the second sleeve for rotation with the first input shaft; wherein the gear selector assembly is arranged to selectively lock the second sleeve for rotation with the first input shaft from operational modes that include: lock the second sleeve for rotation with the first input shaft in forward and reverse torque directions, lock the second sleeve for rotation with the first input shaft in the forward torque direction and not lock in the reverse torque direction; and lock the second sleeve with rotation with the first input shaft in the reverse torque direction and not lock in the forward torque direction.

9. The drive train according to claim 8, wherein, in at least one operational state, torque is provided to the output member from the first electric motor via the fourth gear train; and/or wherein, in at least one operational state, torque is selectively provided to the output member from the second electric motor via the fourth gear train.

10. The drive train according to claim 2, further comprising at least one electronic controller that is arranged to adjust the speed of the first electric motor and the second electric motor, wherein, during a gear shift, the electronic controller is arranged to synchronize the speed of one of the first electric motor and the second electric motor to the speed of a new gear, wherein synchronizing the speed of the first electric motor or the second electric motor to the new gear takes place prior to the respective gear selector assembly engaging the new gear.

11. The drive train according to claim 1, wherein, in at least one operational state, torque is provided to the output member from the first electric motor via the first gear train.

12. The drive train according to claim 1, wherein, in at least one operational state, torque is provided to the output member from the second electric motor via the first gear train.

13. The drive train according to claim 1, wherein, in at least one operational state, torque is provided to the output member by the first and second electric motors simultaneously.

14. The drive train according to claim 1, wherein the first electric motor provides torque to the output member via an odd gear in one operational state and via an even gear in another operational state.

15. The drive train according to claim 1, wherein the second electric motor provides torque to the output member via an odd gear in one operational state and via an even gear in another operational state.

16. The drive train according to claim 1, arranged to provide torque support to the output member during a gear shift.

17. The drive train according to claim 1, further comprising at least one controller, wherein, during a gear shift, the controller is arranged to reduce torque output of one of the first electric motor and the second electric motor, and to increase the torque output of the other of the first electric motor and the second electric motor.

18. The drive train according to claim 1, wherein the maximum power output rating of the first electric motor is different from the maximum power output rating of the second electric motor.

19. The drive train according to claim 1, wherein, in at least one operational state, torque is provided to the output member from the first electric motor via the second gear train.

20. The drive train according to claim 1, wherein, in at least one operational state, torque is provided to the output member from the second electric motor via the second gear train.

21. A drive train, comprising:
a first electric motor; a second electric motor; and
a transmission system including a first input shaft driveably connected to the first electric motor, a second input shaft driveably connected to the second electric motor, an output member, a first gear train including a first gear element rotatably mounted on the first input shaft and a second gear element rotatably mounted on the second input shaft, wherein the first gear element meshes with the second gear element, a second gear train including a third gear element rotatably mounted on the first input shaft and a fourth gear element rotatably mounted on the second input shaft, wherein the third gear element meshes with the fourth gear element, a first gear selector assembly arranged to selectively lock the first and third gear elements for rotation with the first input shaft, and a second gear selector assembly arranged to selectively lock the second and fourth gear elements for rotation with the second input shaft, wherein the first gear selector assembly includes first and second sets of engagement members that are moveable independently of each other into and out of engagement with the first gear element and the third gear element and the first gear selector assembly is arranged to selectively lock each of the first gear element and the third gear element for rotation with the first input shaft from operational modes that include the following modes:
lock the gear element for rotation with the first input shaft in forward and reverse torque directions, lock the gear element for rotation with the first input shaft in the forward torque direction and not lock in the reverse torque direction; and
lock the gear element with rotation with the first input shaft in the reverse torque direction and not lock in the forward torque direction; and wherein the second gear selector assembly includes first and second sets of engagement members that are moveable independently of each other into and out of engagement with the second gear element and the fourth gear element, and
the second gear selector assembly is arranged to selectively lock each of the second gear element and the fourth gear element for rotation with the second input shaft from operational modes that include the following modes:
lock the gear element for rotation with the second input shaft in forward and reverse torque directions, lock the gear element for rotation with the second input shaft in the forward torque direction and not lock in the reverse torque direction; and
lock the gear element with rotation with the second input shaft in the reverse torque direction and not lock in the forward torque direction.

22. The drive train according to claim 21, wherein the first gear element includes a first set of drive formations, the first and second sets of engagement members are arranged such that in a condition wherein the first and second sets of engagement members select the first gear element and a braking force is transferred, the first set of engagement members drivingly engages the first set of drive formations and the second set of engagement members is in an unloaded condition, and in a condition wherein the first and second sets of engagement members select the first gear element and a driving force is transferred, the second set of engagement members drivingly engages the first set of drive formations and the first set of engagement members is in an unloaded condition.

23. The drive train according to claim 22, wherein the third gear element includes a further set of drive formations, the first and second sets of engagement members are arranged such that in a condition wherein the first and second sets of engagement members select the third gear element and a driving force is transferred, the first set of engagement members drivingly engages the further set of drive formations and the second set of engagement members is in an unloaded condition, and in a condition wherein a braking force is transferred, the second set of engagement members drivingly engages the further set of drive formations, and the first set of engagement members is in an unloaded condition.

* * * * *